(12) United States Patent
Nagasaka et al.

(10) Patent No.: US 9,674,778 B2
(45) Date of Patent: Jun. 6, 2017

(54) NETWORK SELECTION CONTROL METHOD AND USER TERMINAL

(71) Applicant: KYOCERA CORPORATION, Kyoto (JP)

(72) Inventors: Yushi Nagasaka, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/223,765

(22) Filed: Jul. 29, 2016

(65) Prior Publication Data

US 2016/0337960 A1 Nov. 17, 2016

Related U.S. Application Data

(63) Continuation of application No. 14/874,162, filed on Oct. 2, 2015, which is a continuation of application No. PCT/JP2014/057921, filed on Mar. 20, 2014.
(Continued)

(51) Int. Cl.
*G01R 31/08* (2006.01)
*H04W 72/00* (2009.01)
(Continued)

(52) U.S. Cl.
CPC .......... *H04W 48/18* (2013.01); *H04B 17/318* (2015.01); *H04W 36/0022* (2013.01);
(Continued)

(58) Field of Classification Search
CPC ..... H04W 36/22; H04W 36/36; H04W 36/14; H04W 48/16; H04W 48/06; H04W 48/18;
(Continued)

(56) References Cited

U.S. PATENT DOCUMENTS 7,031,710 B2 * 4/2006 Pedraza ................ H04W 36/20
455/436
8,521,165 B2 * 8/2013 Suga ..................... H04W 36/22
455/436
(Continued)

FOREIGN PATENT DOCUMENTS

JP 2010-171662 A 8/2010
JP 2010-283866 A 12/2010
(Continued)

OTHER PUBLICATIONS

3GPP TSG-RAN Meeting#57, RP-1201455, Chicago, USA, Sep. 13-15, 2012, New Study Item Proposal on WLAN/3GPP Radio Interworking.
(Continued)

*Primary Examiner* — Hanh N Nguyen
(74) *Attorney, Agent, or Firm* — Studebaker & Brackett PC

(57) ABSTRACT

A network selection control method according to a first aspect is a method of controlling a network selection operation for selecting an access network in which traffic of a user terminal is exchanged from among a cellular RAN and a wireless LAN. The network selection control method comprises: a step A of transmitting, by the cellular RAN, RAN assistance information utilized for the network selection operation; a step B of receiving, by the user terminal, the RAN assistance information; and a step C of performing, by the user terminal, the network selection operation based on the RAN assistance information. The RAN assistance information includes predetermined information for determining whether or not the selection of the wireless LAN is permitted. The predetermined information is associated with a load status of the cellular RAN.

8 Claims, 28 Drawing Sheets

Related U.S. Application Data

(60) Provisional application No. 61/808,777, filed on Apr. 5, 2013, provisional application No. 61/864,219, filed on Aug. 9, 2013, provisional application No. 61/898,791, filed on Nov. 1, 2013, provisional application No. 61/934,364, filed on Jan. 31, 2014.

(51) Int. Cl.

| | | |
|---|---|---|
| *H04W 48/18* | (2009.01) | |
| *H04W 36/00* | (2009.01) | |
| *H04W 36/14* | (2009.01) | |
| *H04W 36/30* | (2009.01) | |
| *H04W 36/20* | (2009.01) | |
| *H04W 48/08* | (2009.01) | |
| *H04W 48/06* | (2009.01) | |
| *H04B 17/318* | (2015.01) | |
| *H04W 76/02* | (2009.01) | |
| *H04W 36/36* | (2009.01) | |
| *H04W 36/34* | (2009.01) | |
| *H04W 36/38* | (2009.01) | |
| *H04W 84/04* | (2009.01) | |
| *H04W 84/12* | (2009.01) | |

(52) U.S. Cl.
CPC ............ *H04W 36/14* (2013.01); *H04W 36/20* (2013.01); *H04W 36/30* (2013.01); *H04W 48/06* (2013.01); *H04W 48/08* (2013.01); *H04W 76/02* (2013.01); *H04W 36/34* (2013.01); *H04W 36/36* (2013.01); *H04W 36/38* (2013.01); *H04W 84/042* (2013.01); *H04W 84/12* (2013.01)

(58) Field of Classification Search
CPC ..... H04W 48/08; H04W 48/20; H04W 36/26; H04W 36/24; H04W 68/00; H04W 28/08; H04W 72/0486
USPC .......... 370/328–332, 337–338; 455/436, 525
See application file for complete search history.

(56) References Cited

U.S. PATENT DOCUMENTS

| | | | |
|---|---|---|---|
| 8,599,699 B2 | 12/2013 | Hirano et al. | |
| 8,706,115 B2 | 4/2014 | Pani et al. | |
| 8,792,924 B2* | 7/2014 | Xiao | H04B 7/024 370/328 |
| 8,824,298 B2 | 9/2014 | Gupta et al. | |
| 9,042,287 B2* | 5/2015 | Luo | H04W 36/20 370/311 |
| 2008/0192925 A1 | 8/2008 | Sachs et al. | |
| 2009/0005029 A1 | 1/2009 | Wang et al. | |
| 2009/0016302 A1 | 1/2009 | Shaheen | |
| 2010/0323698 A1 | 12/2010 | Rune et al. | |
| 2011/0134882 A1 | 6/2011 | Aoyama et al. | |
| 2011/0182273 A1 | 7/2011 | George et al. | |
| 2012/0100856 A1 | 4/2012 | Ishida et al. | |
| 2012/0106370 A1 | 5/2012 | Radulescu et al. | |
| 2012/0115541 A1 | 5/2012 | Suga | |
| 2012/0135739 A1 | 5/2012 | Paterson | |
| 2012/0135781 A1 | 5/2012 | Lu et al. | |
| 2012/0230304 A1 | 9/2012 | Barbu et al. | |
| 2012/0275369 A1 | 11/2012 | Zhang et al. | |
| 2012/0276945 A1* | 11/2012 | Chindapol | H04W 48/20 455/525 |
| 2012/0302241 A1 | 11/2012 | Klingenbrunn et al. | |
| 2013/0183971 A1 | 7/2013 | Tamaki et al. | |
| 2013/0303169 A1 | 11/2013 | Iwamura | |
| 2014/0064068 A1 | 3/2014 | Horn et al. | |
| 2014/0112169 A1 | 4/2014 | Zhou et al. | |
| 2014/0133304 A1 | 5/2014 | Pica et al. | |
| 2014/0213256 A1 | 7/2014 | Meylan et al. | |

FOREIGN PATENT DOCUMENTS

| | | |
|---|---|---|
| JP | 2011-193518 A | 9/2011 |
| JP | 2012-100220 A | 5/2012 |
| JP | 2012-222778 A | 11/2012 |
| JP | 2012-249324 A | 12/2012 |
| JP | 2012-531089 A | 12/2012 |
| JP | 2013-502083 A | 1/2013 |
| JP | 2013-38477 A | 2/2013 |
| JP | 2013-504954 A | 2/2013 |
| WO | 2009/072286 A1 | 6/2009 |
| WO | 2009/084146 A1 | 7/2009 |
| WO | 2011/004599 A1 | 1/2011 |

OTHER PUBLICATIONS

3GPP TSG-RAN2 Meeting#81, R2-130049, St. Julian's, Malta, Jan. 28 to Feb. 1, 2013.

International Search Report issued in PCT/JP2014/057921 mailed Jun. 17, 2014.

Written Opinion issue in PCT/JP2014/057921 mailed Jun. 17, 2014.

An Office Action; "Notice of Reasons for Rejection," issued by the Japanese Patent Office on Jan. 26, 2016, which corresponds to Japanese Patent Application No. 2015-510006 and is related to U.S. Appl. No. 14/874,162; with English language statement of relevance.

"3rd Generation Partnership Project; Technical Specification Group Radio Access Network; Study on WLAN/3GPP Radio Interworking (Release 12)"; 3GPP TR 37.834 V0.3.0; R2-132249; May 2013.

Kyocera; "3GPP/WLAN network selection and applicable rules"; 3GPP TSG-RAN WG2 #82; R2-132080; May 20-24, 2013; Fukuoka, Japan.

LG Electronics Inc. "Issues on relation with ANDSF"; 3GPP TSG-RAN2 Meeting #82; R2-132057; May 20-24, 2013; Fukuoka, Japan.

LG Electronics Inc.; "Text proposal on WLAN 3GPP radio interworking solution 2"; 3GPP TSG-RAN2 Meeting #83bis; R2-133362; Oct. 7-11, 2013; Ljubljana, Slovenia.

LG Electronics Inc.; "Comparison of access network selection solutions"; 3GPP TSG-RAN2 Meeting #82; R2-132055; May 20-24, 2013; Fukuoka, Japan.

Huawei et al.; "Solutions for Interaction between WLAN network selection and network-provided policies for WLAN selection"; SA WG2 Meeting #95; S2-130125; Jan. 28 and Feb. 1, 2013; Prague, CZ.

An Office Action issued by the Japanese Patent Office on Jun. 21, 2016, which corresponds to Japanese Patent Application No. 2015-510006; and is related to U.S. Appl. No. 15/223,765; with English language statement of relevance.

3GPP TSG RAN WG2, R2-130969, "Network Selection Policy Based on QoS," Chicago, IL., Apr. 15-19, 2013, 3 pp.

JP Office Action dated Nov. 29, 2016 from corresponding JP Appl No. 2016-209256 with concise statement of relevance, 5 pp.

* cited by examiner

FIG. 16

| REPORTED VALUE | MEASURED QUANTITY VALUE | UNIT |
|---|---|---|
| LinkStability_00 | LINK STABILITY < -140 | dBm |
| LinkStability_01 | -140 ~ -139 | dBm |
| LinkStability_02 | -139 ~ -138 | dBm |
| ... | ... | ... |
| LinkStability_95 | -46 ~ -45 | dBm |
| LinkStability_96 | -45 ~ -44 | dBm |
| LinkStability_97 | -44 < LINK STABILITY | dBm |

FIG. 17

| | eNB | AP1 | AP2 | AP3 |
|---|---|---|---|---|
| LOAD LEVEL | 4 | 5 | 1 | 3 |
| SIGNAL STRENGTH LEVEL | 3 | 2 | 7 | 4 |
| LINK STABILITY LEVEL | 7 | 3 | 2 | 7 |
| ... | ... | ... | ... | ... |

FIG. 23

```
If ( RAN condition is poor && a WLAN condition is good ){
    UE selects WLAN
}
If ( RAN condition is good || a WLAN condition is poor ){
    UE does not select WLAN but select RAN
}
```

FIG. 24

```
If ( Indicator==ON && a WLAN condition is good ){
    UE selects WLAN
}
If ( Indicator==OFF || a WLAN condition is poor ){
    UE steers all traffic from WLAN to RAN
}
```

FIG. 25

```
If ( Indicator==ON && a WLAN condition is rich ){
    UE accepts the WLAN
} else if ( Indicator==OFF ){
    UE cannot accept additional WLAN
}
If ( a WLAN condition is poor ){
    UE steers all traffic from WLAN to RAN
}
```

FIG. 26

```
If ( measured RAN signal strength < threshold1 && a WLAN condition
is good ){
    UE selects WLAN
}
If ( measured RAN signal strength > threshold2 || a WLAN condition
is poor ){
    UE steers all traffic from WLAN to RAN
}
```

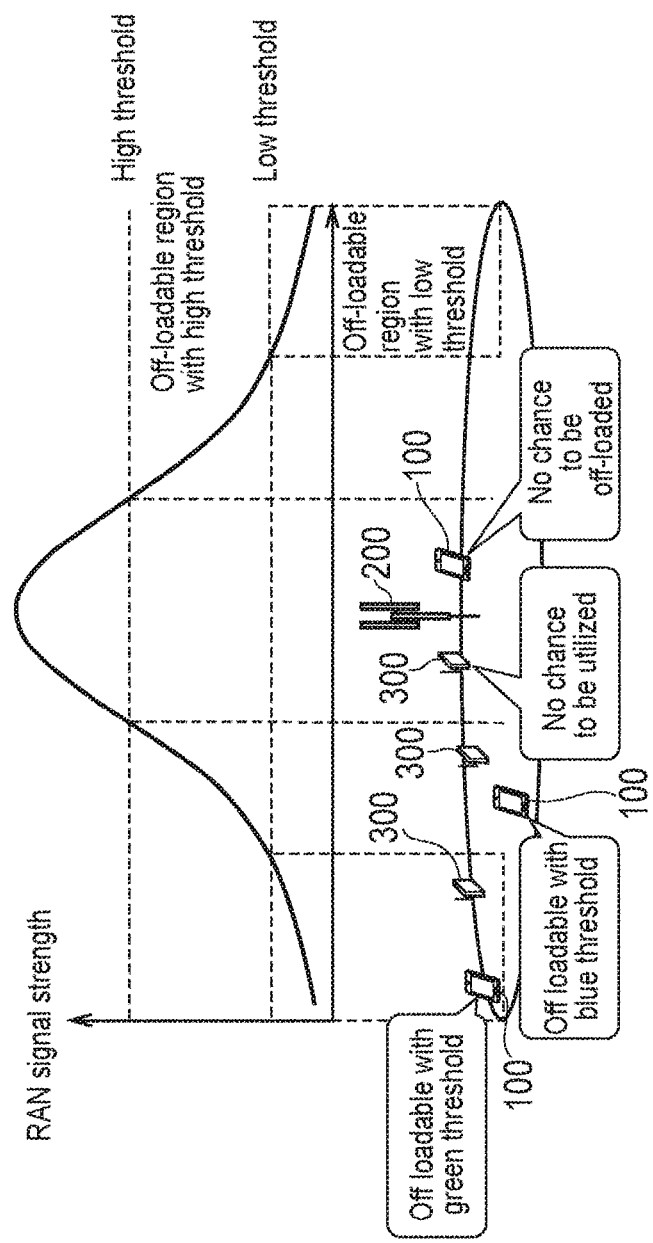

FIG. 28

*The UE shall move traffic [e.g. for offloadable APN] from 3GPP to WLAN if all the following conditions are fulfilled if corresponding parameters are broadcast or send with dedicated signaling:*

- Rsrp < threshRsrpLow or Rsrq < threshRsrqLow
- bssLoad < threshBssLoadLow
- dlBackhaulRate > threshDlBackhaulRateHigh
- ulBackhaulRate > threshUlBackhaulRateHigh

*The UE shall move offloadable traffic from WLAN to 3GPP if one or more of the following conditions is fulfilled if corresponding parameters are broadcast or send with dedicated signaling:*

- Rsrp > threshRsrpHigh
- Rsrq > threshRsrqHigh

FIG. 29

The UE shall move traffic [e.g. for offloadable APN] from 3GPP to WLAN if all the following conditions are fulfilled if corresponding parameters are broadcast or send with dedicated signaling:

- Rscp < threshRscpLow or EcNo < threshEcNoLow
- bssLoad < threshBssLoadLow
- dlBackhaulRate > threshDlBackhaulRateHigh
- ulBackhaulRate > threshUlBackhaulRateHigh

The UE shall move offloadable traffic from WLAN to 3GPP if one or more of the following conditions is fulfilled if corresponding parameters are broadcast or send with dedicated signaling:

- Rscp > threshRscpHigh
- EcNo > threshEcNoHigh

FIG. 30

```
If (((Rsrp < threshRsrpLow) || (Rsrq < threshRsrqLow)) &&
    (bssLoad < threshBssLoadLow) &&
    (dlBackhaulRate > threshDlBackhaulRateHigh) &&
    (ulBackhaulRate > threshUlBackhaulRateHigh)){
        UE shall move offloadable traffic to WLAN
}
If ((Rsrp > threshRsrpHigh) || (Rsrq > threshRsrqHigh) ||
    (bssLoad > threshBssLoadHigh) || (RCPI < threshRcpi) || (RSNI
< threshRsni)){
        UE shall move traffic from WLAN to 3GPP
}
```

FIG. 31

```
If (((Rscp < threshRscpLow) || (EcNo < threshEcNoLow)) &&
    (bssLoad < threshBssLoadLow) &&
    (dlBackhaulRate > threshDlBackhaulRateHigh) &&
    (ulBackhaulRate > threshUlBackhaulRateHigh)){
        UE shall move offloadable traffic to WLAN
}
If ((Rscp > threshRscpHigh) || (Rsrq > threshRsrqHigh) ||
    (bssLoad > threshBssLoadHigh) || (RCPI < threshRcpi) || (RSNI
< threshRsni)){
        UE shall move traffic from WLAN to 3GPP
}
```

FIG. 32

```
If ((Rsrp > threshRsrpHigh) || (Rsrq > threshRsrqHigh) ||
(RCPI < threshRcpi) || (RSNI < threshRsni)){
        UE shall move traffic from WLAN to 3GPP
}
```

FIG. 34

```
If ((Rsrp < threshRsrpLow) && (Rsrq < threshRsrqLow) &&
    (bssLoad < threshBssLoadLow) &&
    (dlBackhaulRate > threshDlBackhaulRateHigh) &&
    (ulBackhaulRate > threshUlBackhaulRateHigh)){
        UE shall move offloadable traffic to WLAN
}
If ( (bssLoad > threshBssLoadHigh) || (RCPI < threshRcpi) || (RSNI
< threshRsni)){
        UE shall move traffic from WLAN to 3GPP
}
```

NETWORK SELECTION CONTROL METHOD AND USER TERMINAL

TECHNICAL FIELD

The present disclosure relates to a network selection control method and a user terminal, in which a cellular communication system is worked in cooperation with a wireless LAN system.

BACKGROUND ART

In recent years, a user terminal including a cellular communication unit and a wireless LAN communication unit (so-called dual terminal) is becoming widely used. Furthermore, a wireless LAN access point (hereinafter simply referred to as an "access point") managed by an operator of a cellular communication system increases.

Therefore, 3GPP (3rd Generation Partnership Project) which is a project aiming to standardize a cellular communication system plans to consider a technology capable of enhancing cooperation between a cellular communication system and a wireless LAN system (see Non-patent document 1).

PRIOR ART DOCUMENT

Non-Patent Document

Non-patent document 1: 3GPP contribution RP-1201455

SUMMARY

It is considered that, when the cooperation between a cellular communication system and a wireless LAN system is enhanced, it is possible to disperse a traffic load of the cellular base station to the wireless LAN system.

Therefore, an object of the present disclosure is to provide a user terminal, apparatus for a user terminal, and a method for a user terminal with which it is possible to enhance a cooperation between a cellular communication system and a wireless LAN system.

A user terminal according to an embodiment, comprises: a controller containing at least one processor and at least one memory, and configured to communicate data using a wireless local area network (WLAN) while the user terminal has a radio resource control (RRC) connection with a cellular base station, wherein the controller is further configured to execute processes of: receiving a WLAN measurement configuration from the cellular base station, the WLAN measurement configuration including first WLAN identifiers; receiving a beacon signal from at least one WLAN; acquiring WLAN load information included in the beacon signal, the WLAN load information indicating load level of the at least one WLAN; measuring WLAN received signal strengths for WLANs based on the WLAN measurement configuration; prioritizing second WLAN identifiers corresponding to the WLANs based on the WLAN received signal strengths; generating a list including the second WLAN identifiers in order of priority; and transmitting a report including the list to the cellular base station, the report further including the WLAN load information.

An apparatus for a user terminal according to an embodiment, comprises: at least one processor and at least one memory, the at least one processor configured to communicate data using a wireless local area network (WLAN) while the user terminal has a radio resource control (RRC) connection with a cellular base station, wherein the at least one processor is further configured to execute processes of: receiving a WLAN measurement configuration from the cellular base station, the WLAN measurement configuration including first WLAN identifiers; receiving a beacon signal from at least one WLAN; acquiring WLAN load information included in the beacon signal, the WLAN load information indicating load level of the at least one WLAN; measuring WLAN received signal strengths for WLANs based on the WLAN measurement configuration; prioritizing second WLAN identifiers corresponding to the WLANs based on the WLAN received signal strengths; generating a list including the second WLAN identifiers in order of priority; and transmitting a report including the list to the cellular base station, the report further including the WLAN load information.

A method according to an embodiment for a user terminal configured to communicate data using a wireless local area network (WLAN) while the user terminal has a radio resource control (RRC) connection with a cellular base station, comprises: receiving a WLAN measurement configuration from the cellular base station, the WLAN measurement configuration including first WLAN identifiers; receiving a beacon signal from at least one WLAN; acquiring WLAN load information included in the beacon signal, the WLAN load information indicating load level of the at least one WLAN; measuring WLAN received signal strengths for WLANs based on the WLAN measurement configuration; prioritizing second WLAN identifiers corresponding to the WLANs based on the WLAN received signal strengths; generating a list including the second WLAN identifiers in order of priority; and transmitting a report including the list to the cellular base station, the report further including the WLAN load information.

BRIEF DESCRIPTION OF THE DRAWINGS

FIG. 16 is a configuration diagram of a mapping table according to the first embodiment.

FIG. 17 is a diagram for illustrating an example of a determination algorithm according to the first embodiment.

FIGS. 18(a) and 18(b) are diagrams illustrating a network selection control method according to the second embodiment.

FIG. 23 is a diagram illustrating a concept of RAN rule according to the third embodiment.

FIG. 24 is a diagram illustrating the Option 1a according to the third embodiment.

FIG. 25 is a diagram illustrating the Option 1b according to the third embodiment.

FIG. 26 is a diagram illustrating the Option 2 according to the third embodiment.

FIG. 27 is a diagram illustrating an offload to WLAN by RAN signal threshold according to the third embodiment.

FIG. 28 is a diagram illustrating an example of use method of RAN assistance parameters in LTE.

FIG. 29 is a diagram illustrating an example of use method of RAN assistance parameters in UMTS.

FIG. 30 is a diagram illustrating simplest rule for LTE.

FIG. 31 is a diagram illustrating simplest rule for UMTS.

FIG. 32 is a diagram illustrating problems with simple rules.

FIG. 34 illustrates a selection rule for adopting Option 2 according to the fourth embodiment.

DESCRIPTION OF EMBODIMENTS

Overview of Embodiments

Figure 1:
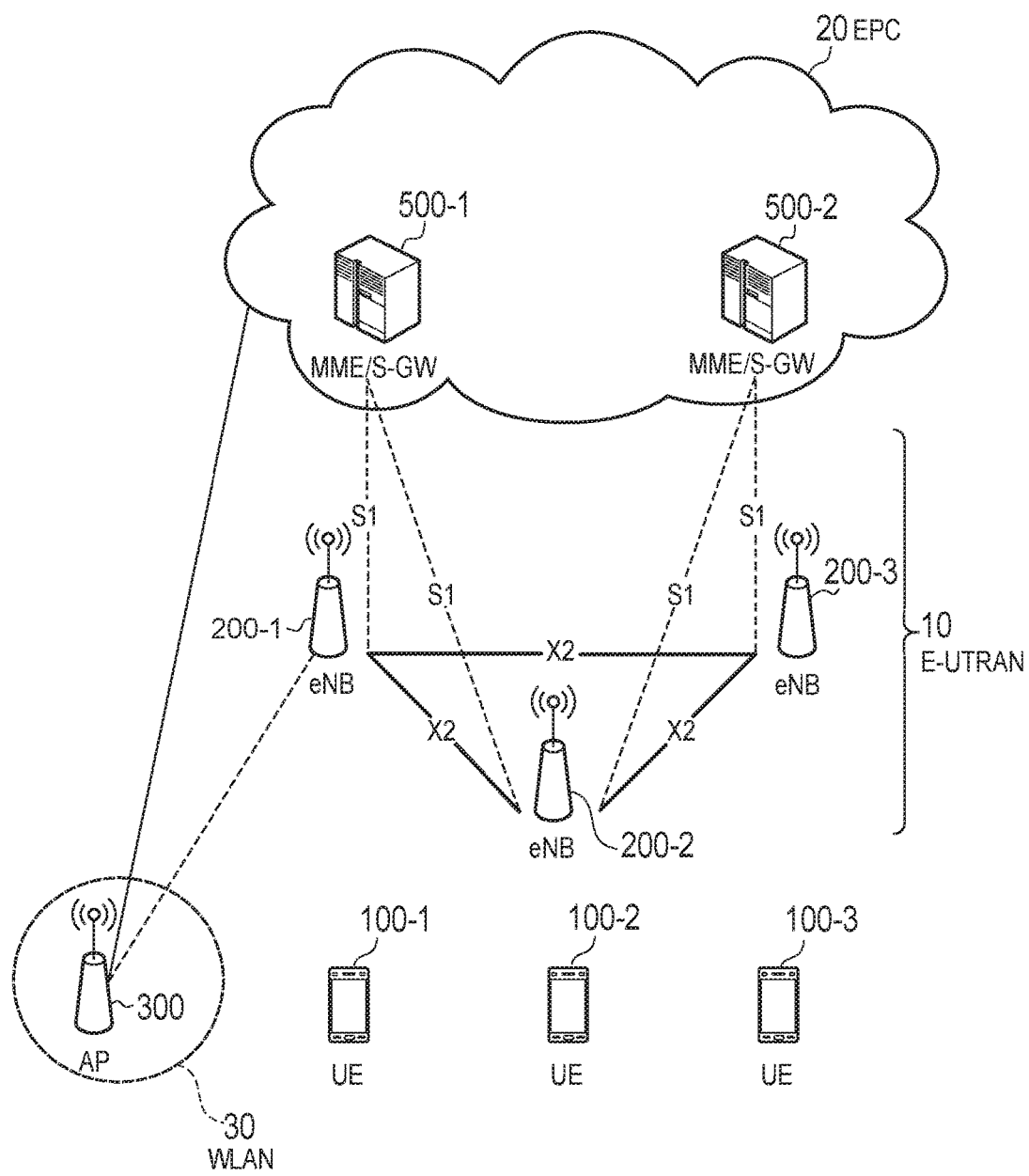
FIG. 1 is a system configuration diagram according to a first embodiment and a second embodiment.

A network selection control method according to embodiments is a method of controlling a network selection operation for selecting an access network in which traffic of a user terminal is exchanged from among a cellular RAN and a wireless LAN. The network selection control method comprises: a step A of transmitting, by the cellular RAN, RAN assistance information utilized for the network selection operation; a step B of receiving, by the user terminal, the RAN assistance information; and a step C of performing, by the user terminal, the network selection operation based on the RAN assistance information. The RAN assistance information includes predetermined information for determining whether or not the selection of the wireless LAN is permitted. The predetermined information is associated with a load status of the cellular RAN.

In the embodiments, the predetermined information is an indicator indicating whether or not the selection of the wireless LAN is permitted. In the step A, the cellular RAN updates the indicator in accordance with the load status of the cellular RAN. In the step C, the user terminal determines whether or not the selection of the wireless LAN is permitted, based on the indicator.

In the embodiments, the predetermined information is a reference value indicating a probability that the selection of the wireless LAN is permitted. In the step A, the cellular RAN updates the reference value in accordance with the load status of the cellular RAN. In the step C, the user terminal determines whether or not the selection of the wireless LAN is permitted in accordance with whether a random number generated at the user terminal exceeds the reference value.

In the embodiments, the predetermined information is a threshold with which a status regarding the cellular RAN or the wireless LAN is compared. In the step A, the cellular RAN updates the threshold in accordance with the load status of the cellular RAN. In the step C, the user terminal determines whether or not the selection of the wireless LAN is permitted by comparing the status with the threshold.

In the embodiments, the status is at least one of: a radio status of the wireless LAN, a load status of the wireless LAN, and a radio status of the cellular RAN.

In the embodiments, in the step C, the user terminal selects the wireless LAN when the selection of the wireless LAN is permitted based on the predetermined information and a wireless LAN status is good.

In the embodiments, in the step C, the user terminal selects the cellular RAN when the selection of the wireless LAN is not permitted based on the predetermined information.

In the embodiments, in the step C, the user terminal selects the cellular RAN when the wireless LAN status is poor, irrespective of the predetermined information.

In the embodiments, in the step C, the user terminal selecting the wireless LAN is controlled not to transfer additional traffic to the wireless LAN, when the selection of the wireless LAN is not permitted based on the predetermined information.

In the embodiments, in the step C, the user terminal not selecting the wireless LAN is controlled not to select the wireless LAN, when the selection of the wireless LAN is not permitted based on the predetermined information.

In the embodiments, the step A comprises: a step of transmitting first RAN assistance information from the cellular RAN by a broadcast; and a step of transmitting second RAN assistance information from the cellular RAN by a unicast. The step B comprises: a step of receiving, by the user terminal, the first RAN assistance information; and a step of receiving, by the user terminal, the second RAN assistance information. When a first parameter included in the first RAN assistance information and a second parameter included in the second RAN assistance information are overlapped, the user terminal preferentially applies the second parameter than the first parameter.

A user terminal according to embodiments performs a network selection operation for selecting an access network in which traffic of the user terminal is exchanged from among a cellular RAN and a wireless LAN. The user terminal comprises: a receiver that receives RAN assistance information utilized for the network selection operation from the cellular RAN; and a controller that performs the network selection operation based on the RAN assistance information. The RAN assistance information includes predetermined information for determining whether or not the selection of the wireless LAN is permitted. The predetermined information is associated with a load status of the cellular RAN.

A network selection control method according to embodiments is a method of controlling a network selection operation for selecting an access network in which traffic of a user terminal is exchanged from among a cellular RAN and a wireless LAN. The network selection control method comprises: a step A of steering, by the user terminal, the traffic from the cellular RAN to the wireless LAN; and a step B of steering, by the user terminal, the traffic back to the cellular RAN based on at least one of a load status of the cellular RAN and a load status of the wireless LAN.

In the embodiments, in the step B, the user terminal steers the traffic back to the cellular RAN when the cellular RAN is a low load status.

In the embodiments, in the step B, the user terminal steers the traffic back to the cellular RAN when the wireless LAN is a high load status.

In the embodiments, in the step B, the user terminal steers the traffic back to the cellular RAN when the cellular RAN is a low load status and the wireless LAN is a high load status.

In the embodiments, in the step B, the user terminal steers the traffic back to the cellular RAN when the cellular RAN is a low load status or the wireless LAN is a high load status.

In the embodiments, the user terminal has a specific function capable of exchanging multiple traffics with both the wireless LAN and the cellular RAN at the same time. In the step B, the user terminal steers traffic back to the cellular RAN and will not keep any traffic in the wireless LAN when a criteria to steer traffic back to the cellular RAN is satisfied.

In the embodiments, the specific function is an ISRP (Inter-System Routing Policy) function.

A user terminal according to embodiments performs a network selection operation of selecting an access network with which exchanges traffic of the user terminal from among a cellular RAN and a wireless LAN. The user terminal comprises: a controller that steers the traffic from the cellular RAN to the wireless LAN. The controller steers the traffic back to the cellular RAN based on at least one of a load status of the cellular RAN and a load status of the wireless LAN.

First Embodiment

Below, with reference to the drawing, each embodiment will be described in a case where an LTE system that is a cellular communication system configured in compliance with the 3GPP standards is worked in cooperation with a wireless LAN (WLAN) system.

(System Configuration)

FIG. 1 is a system configuration diagram according to the present embodiment. As shown in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 corresponds to a radio access network. The EPC 20 corresponds to a core network.

The UE 100 is a mobile radio communication device and performs radio communication with a cell with which a connection is established. The UE 100 corresponds to the user terminal. The UE 100 is a terminal (dual terminal) that supports both communication schemes of cellular communication and WLAN communication.

The E-UTRAN 10 includes a plurality of eNBs 200 (evolved Node-Bs). The eNB 200 corresponds to a base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100. Further, the eNB 200, for example, has a radio resource management (RRM) function, a routing function of user data, and a measurement control function for mobility control and scheduling.

The eNBs 200 are connected mutually via an X2 interface. Further, the eNB 200 is connected to MME/S-GW 500 included in the EPC 20 via an S1 interface.

The EPC 20 includes a plurality of MME (Mobility Management Entity)/S-GWs (Serving-Gateways) 500. The MME is a network node that performs various mobility controls and the like, for the UE 100 and corresponds to a controller. The S-GW is a network node that performs transfer control of user data and corresponds to a mobile switching center.

The WLAN system (WLAN 30) includes WLAN AP (hereinafter referred to as "AP") 300. The WLAN system is configured to be in compliance with various IEEE 802.11 specifications, for example. The AP 300 communicates with the UE 100 in a frequency band (WLAN frequency band) different from a cellular frequency band. The AP 300 is connected to the EPC 20 via a router, etc. However, the present disclosure is not limited to the case in which the eNB 200 and the AP 300 are individually collocated. The eNB 200 and the AP 300 may also be collocated at the same place. Alternatively, the eNB 200 and the AP 300 may be directly connected to each other through an arbitrary interface of an operator.

Subsequently, a configuration of the UE 100, the eNB 200, and the AP 300 will be described.

Figure 2:
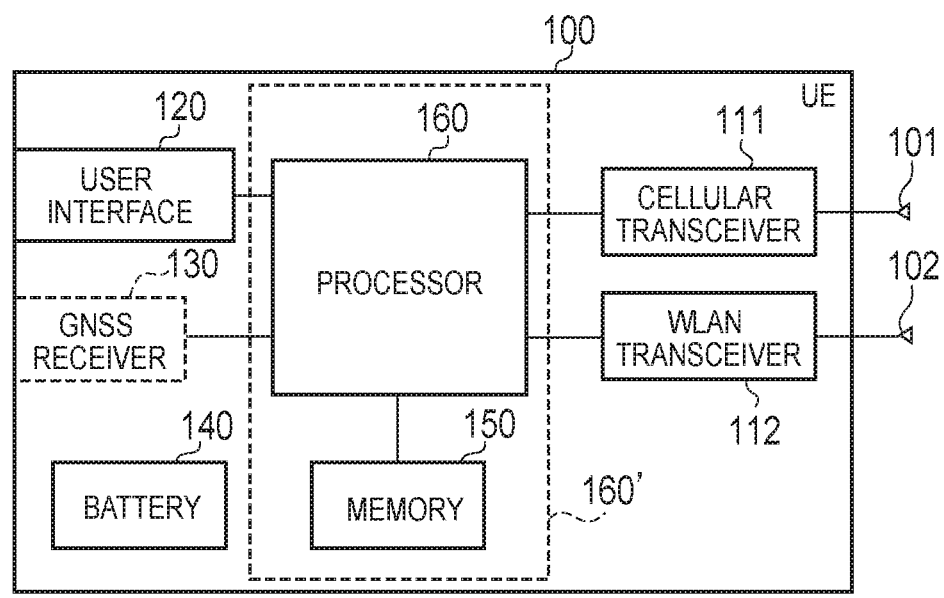
FIG. 2 is a block diagram of UE (user terminal) according to the first embodiment and the second embodiment.

FIG. 2 is a block diagram of the UE 100. As shown in FIG. 2, the UE 100 includes: antennas 101 and 102; a cellular transceiver (cellular communication unit) 111; a WLAN transceiver (WLAN communication unit) 112; a user interface 120; a GNSS (Global Navigation Satellite System) receiver 130; a battery 140; a memory 150; and a processor 160. The memory 150 and the processor 160 constitute a controller. The UE 100 may not have the GNSS receiver 130. Furthermore, the memory 150 may be integrally formed with the processor 160, and this set (that is, a chipset) may be called a processor 160'.

The antenna 101 and the cellular transceiver 111 are used for transmitting and receiving a cellular radio signal. The cellular transceiver 111 converts a baseband signal output from the processor 160 into the cellular radio signal, and transmits the same from the antenna 101. Further, the cellular transceiver 111 converts the cellular radio signal received by the antenna 101 into the baseband signal, and outputs the same to the processor 160.

The antenna 102 and the WLAN transceiver 112 are used for transmitting and receiving a WLAN radio signal. The WLAN transceiver 112 converts the baseband signal output from the processor 160 into a WLAN radio signal, and transmits the same from the antenna 102. Further, the WLAN transceiver 112 converts the WLAN radio signal received by the antenna 102 into a baseband signal, and outputs the same to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes the baseband processor that performs modulation and demodulation, encoding and decoding and the like on the baseband signal and a CPU that performs various processes by executing the program stored in the memory 150. The processor 160 may further include a codec that performs encoding and decoding on sound and video signals. The processor 160 executes various processes and various communication protocols described later.

Figure 3:
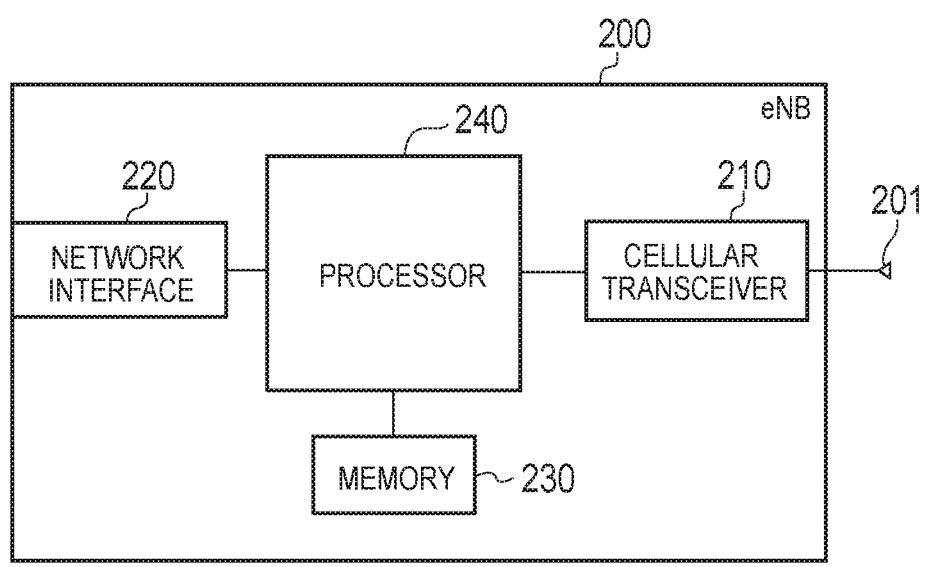
FIG. 3 is a block diagram of eNB (cellular base station) according to the first embodiment and the second embodiment.

FIG. 3 is a block diagram of the eNB 200. As shown in FIG. 3, the eNB 200 includes an antenna 201, a cellular transceiver 210, a network interface 220, a memory 230, and a processor 240. The memory 230 and the processor 240 constitute a controller.

The antenna 201 and the cellular transceiver 210 are used for transmitting and receiving a cellular radio signal. The cellular transceiver 210 converts the baseband signal output from the processor 240 into the cellular radio signal, and transmits the same from the antenna 201. Furthermore, the cellular transceiver 210 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. Further, the network interface 220 is used for communication with the AP 300 via the EPC 20.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 implements various processes and various communication protocols described later.

Figure 4:
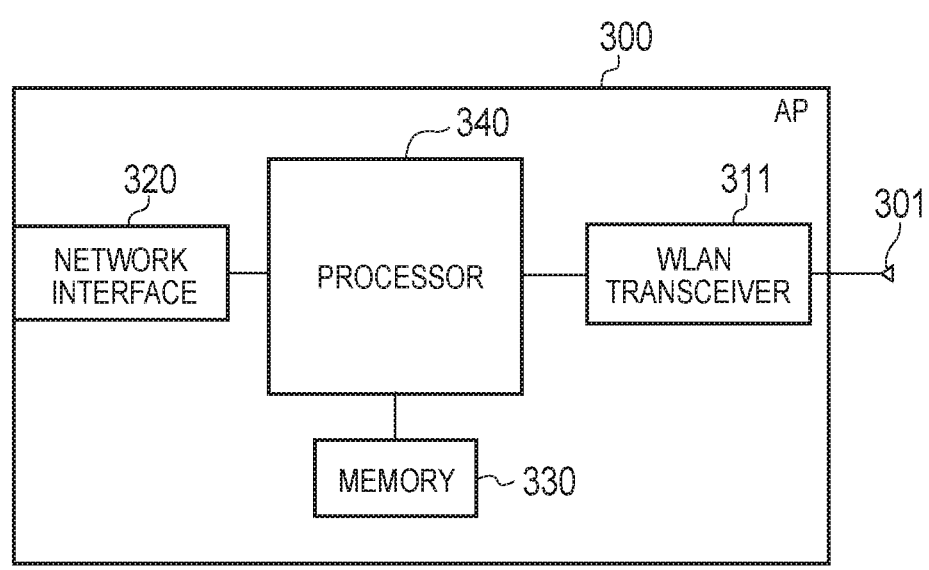
FIG. 4 is a block diagram of AP (access point) according to the first embodiment and the second embodiment.

FIG. 4 is a block diagram of the AP 300. As shown in FIG. 4, the AP 300 includes an antenna 301, a WLAN transceiver 311, a network interface 320, a memory 330, and a processor 340.

The antenna 301 and the WLAN transceiver 311 are used for transmitting and receiving the WLAN radio signal. The WLAN transceiver 311 converts the baseband signal output from the processor 340 into the WLAN radio signal and transmits the same from the antenna 301. Further, the WLAN transceiver 311 converts the WLAN radio signal received by the antenna 301 into the baseband signal and outputs the same to the processor 340.

The network interface 320 is connected to the EPC 20 via a router, etc. Further, the network interface 320 is used for communication with the eNB 200 via the EPC 20.

The memory 330 stores a program to be executed by the processor 340 and information to be used for a process by the processor 340. The processor 340 includes the baseband processor that performs modulation and demodulation, encoding and decoding and the like on the baseband signal and a CPU that performs various processes by executing the program stored in the memory 330.

Figure 5:
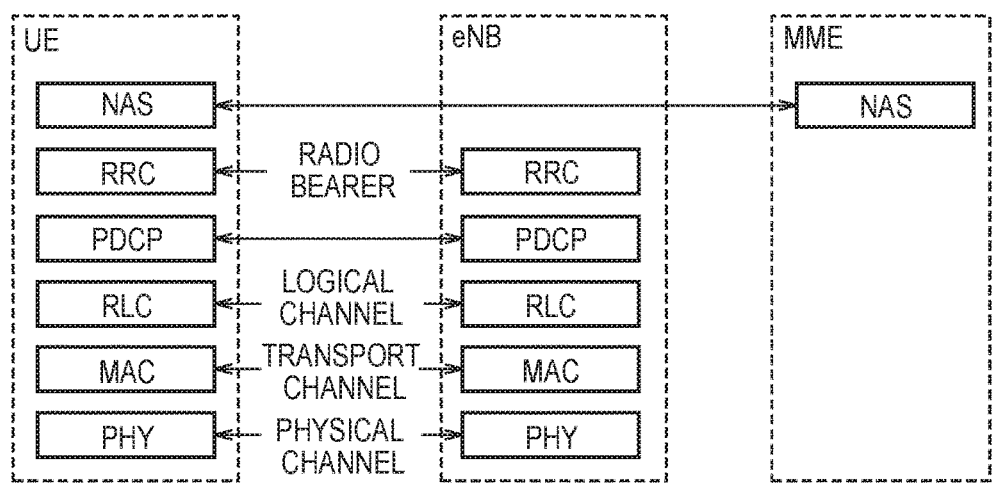
FIG. 5 is a protocol stack diagram of a radio interface in an LTE system.

FIG. 5 is a protocol stack diagram of a radio interface in the LTE system. As illustrated in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler that selects a transport format (a transport block size, a modulation and coding scheme and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), otherwise, the UE 100 is in an idle state (RRC idle state).

A NAS (Non-Access Stratum) layer positioned above the RRC layer performs session management, mobility management and the like.

Figure 6:
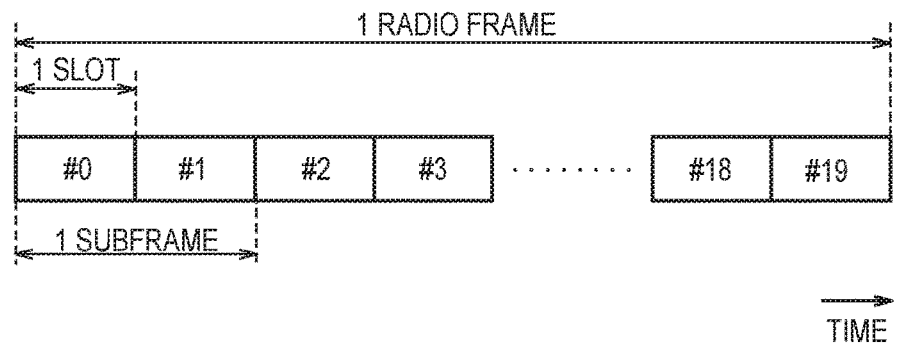
FIG. 6 is a configuration diagram of a radio frame used in the LTE system.

FIG. 6 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources assigned to the UE 100, a frequency resource can be designated by a resource block and a time resource can be designated by a subframe (or slot).

(Operation According to First Embodiment)

Next, an operation according to the present embodiment will be described.

Figure 7:
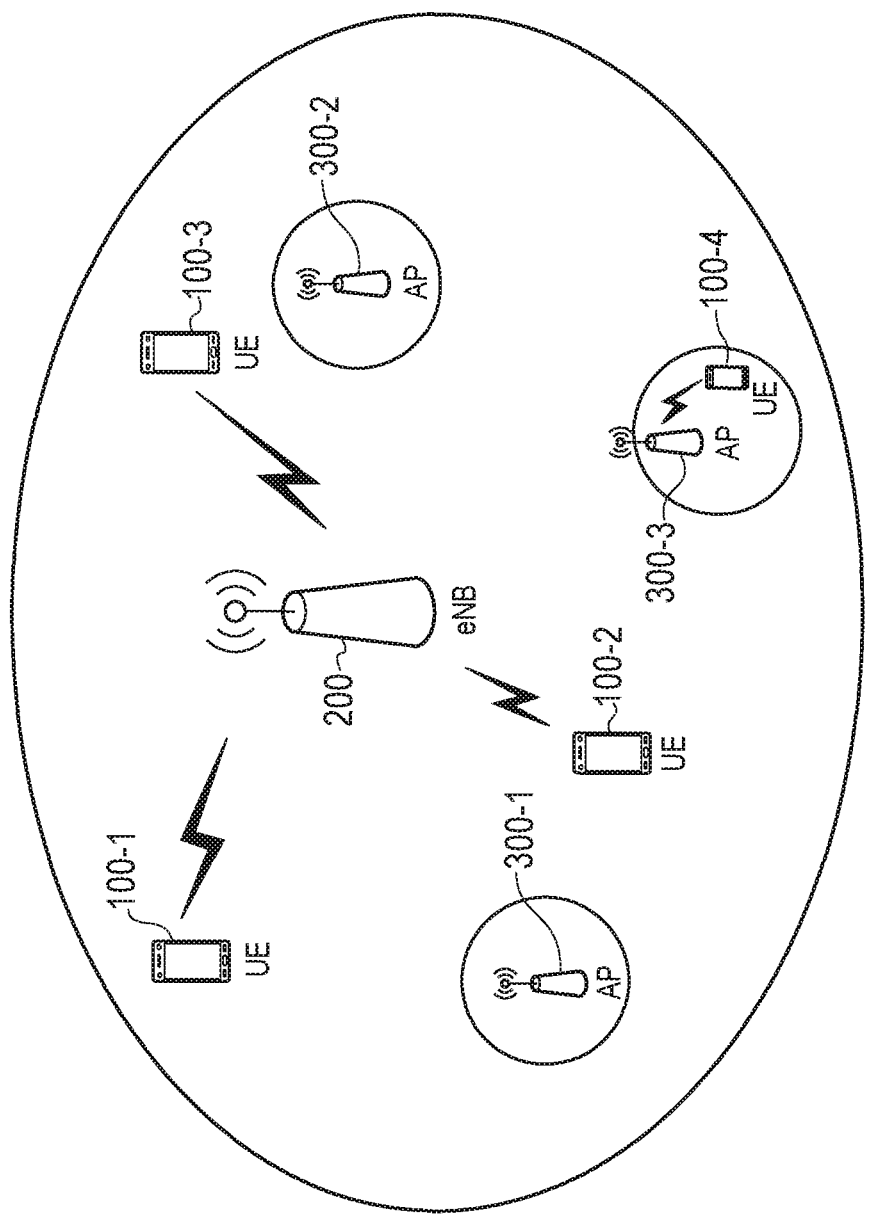
FIG. 7 is a diagram for illustrating an operation environment according to the first embodiment.

FIG. 7 is a diagram for illustrating an operation environment according to the present embodiment. As illustrated in FIG. 7, a plurality of APs 300 are provided in a coverage of the eNB 200. Each of the plurality of APs 300 is AP (Operator controlled AP) managed by an operator. FIG. 7 illustrates only three APs 300; however, in an actual environment, a large number of APs 300 are provided in the coverage of the eNB 200.

In the actual environment, APs (Non-operator controlled APs) not controlled by the operator also exist. The Non-operator controlled APs include public APs (so-called Free WiFi) opened free of charge, and APs owned by a user.

Furthermore, a plurality of UEs 100 are positioned in the coverage of the eNB 200. UE 100-1 to UE 100-3 are connected to the eNB 200, and perform cellular communication with the eNB 200. UE 100-4 is connected to AP 300-3, and performs WLAN communication with the AP 300-3.

When the eNB 200 houses a large number of UEs 100, a load level of the eNB 200 increases. Here, the "load level" indicates the degree of congestion of the eNB 200 such as a traffic load of the eNB 200 or radio resource use ratio of the eNB 200. Thus, at least a part of traffic exchanged between the UE 100 and the eNB 200 is allowed to transition to the wireless LAN system, so that it is possible to disperse the load of the eNB 200 to the wireless LAN system.

Hereinafter, a description will be provided for an operation pattern so that traffic exchanged between the UE 100 and the eNB 200 is allowed to transition (hereinafter referred to as "offload") to the wireless LAN system. The offload herein includes the case in which at least a part of the traffic is allowed to transition to the wireless LAN system while maintaining a connection with the eNB 200, as well as the case in which all of the traffic exchanged between the UE 100 and the eNB 200 is allowed to transition to the wireless LAN system.

An operation pattern 1 is a pattern in which the eNB 200 selects AP 300 to which an offload is destined (that is, a traffic transition destination). On the other hand, an operation pattern 2 is a pattern in which the UE 100 selects the AP 300 of the offload destination.

Furthermore, an operation pattern 3 is a mixed pattern of the operation patterns 1 and 2, and is a pattern in which the eNB 200 finally selects the AP 300 of the offload destination. An operation pattern 4 is a mixed pattern of the operation patterns 1 and 2, and is a pattern in which the UE 100 finally selects the AP 300 of the offload destination. An operation pattern 5 is a mixed pattern of the operation patterns 3 and 4.

An operation pattern 6 is a pattern in which the Non-operator controlled AP is considered.

In each of the operation patterns, it is assumed that the UE 100 is in a state in which the UE 100 is connected to the eNB 200 (connected state), and the WLAN transceiver 112 of the UE 100 is in an operation state (ON state). Furthermore, it is assumed that the eNB 200 can acquire information on the Operator controlled AP in the coverage of the eNB 200 via a backhaul, for example.

(1) Operation Pattern 1

Figure 8:
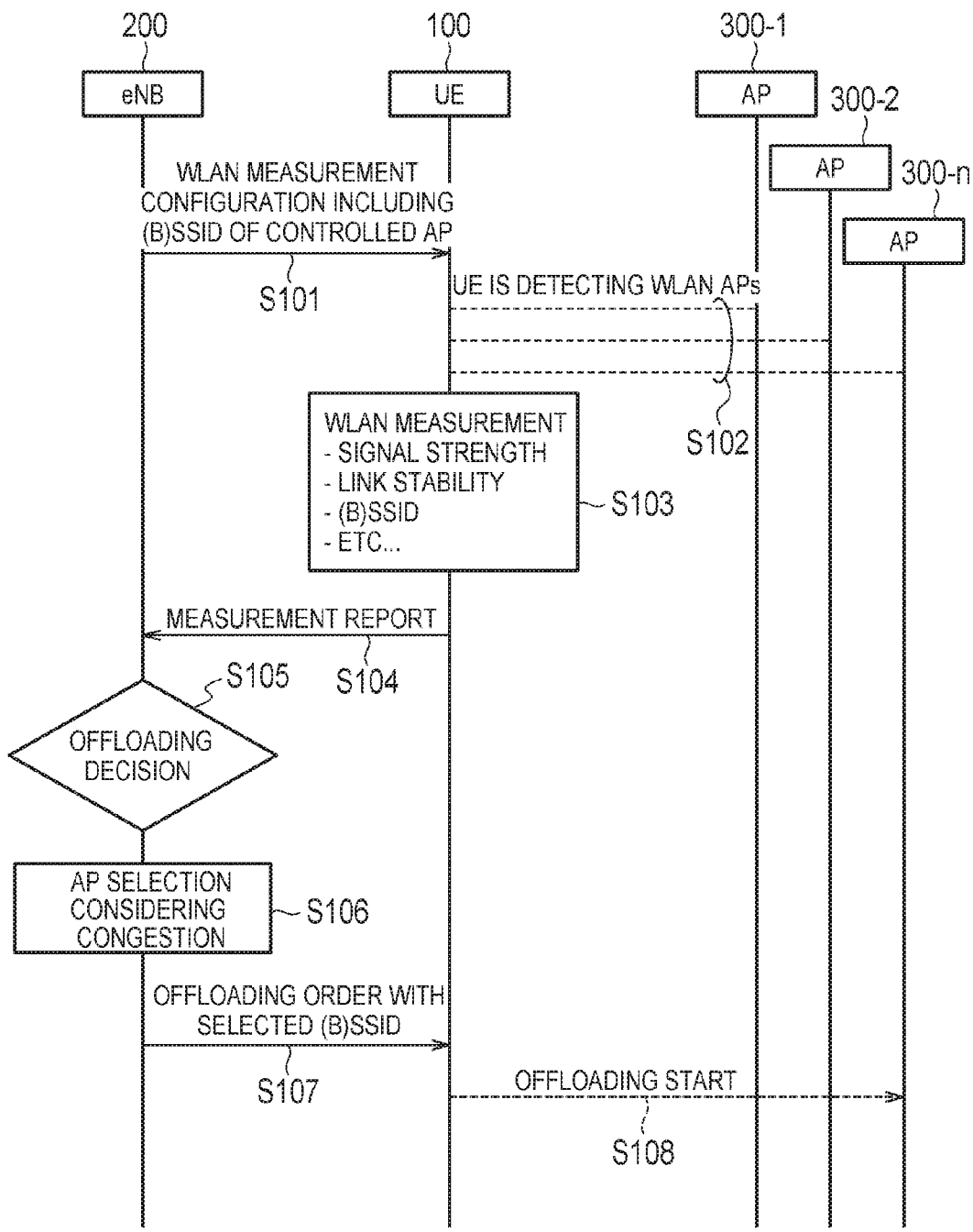
FIG. 8 is a sequence diagram of an operation pattern 1 according to the first embodiment.

FIG. 8 is a sequence diagram of the operation pattern 1.

As illustrated in FIG. 8, in step S101, the eNB 200 transmits, to the UE 100, WLAN measurement configuration information for controlling measurement for the wireless LAN system (wireless LAN measurement). The eNB 200, for example, transmits the WLAN measurement configuration information to the UE 100 by employing handover of the UE 100, selection of the UE 100, a paging area change of the UE 100, or a change of a network status as a trigger. Alternatively, the eNB 200 may transmit the WLAN measurement configuration information to the UE 100 by employing, as a trigger, the fact that the load level of the eNB 200 exceeds a threshold.

The WLAN measurement configuration information includes each of identifiers of a plurality of APs 300 (Operator controlled APs) provided in the coverage area of the eNB 200. The identifier (hereinafter referred to as an "AP identifier") of the AP 300 indicates SSD) (Service Set Identifier), BSSID (Basic Service Set Identifier), or an arbitrary ID that identifies AP designed by an operator.

The WLAN measurement configuration information may also include information indicating how a radio link status between the UE 100 and the AP 300 should be measured, and information indicating how a measurement result (for example, a report trigger) should be reported. Moreover, the WLAN measurement configuration information may also include information indicating which operation patterns (the operation patterns 1 to 5) to be followed.

The WLAN measurement configuration information may also include information indicating whether or not to confirm a measurement configuration (whether or not to perform wireless LAN measurement) even when the UE 100 is connected to the AP 300. Furthermore, it is preferable that the UE 100 continues to confirm the measurement configuration until an optimal AP 300 is selected. On the other hand, after the UE 100 starts offload to the AP 300, it is preferable not to confirm the measurement configuration in order to reduce a processing load.

In step S102, the UE 100 detects APs 300 on the basis of the AP identifiers included in the WLAN measurement configuration information. Since each AP 300 transmits a beacon signal including the AP identifier of the AP 300, the UE 100 scans the beacon signal including the AP identifiers included in the WLAN measurement configuration information, thereby the UE 100 can detect the APs 300.

In step S103, the UE 100 performs wireless LAN measurement according to the WLAN measurement configuration information. The UE 100 measures a radio link status between the detected AP 300 and the UE 100. The radio link status includes signal strength of the beacon signal, radio link stability (details thereof will be described later) and the like. Furthermore, when the beacon signal includes information indicating a load level of the AP 300 (that is, load information), the UE 100 may acquire the load information.

In step S104, the UE 100 reports the measured radio link status to the eNB 200. Specifically, the UE 100 associates the AP identifiers with the radio link status (the signal strength of the beacon signal, the radio link stability and the like), and transmits a WLAN measurement report including the radio link status and the AP identifiers to the eNB 200. Moreover, the UE 100 may control the WLAN measurement report to include the load information of the AP 300. Furthermore, the UE 100 may also control the WLAN measurement report to include information on a movement speed, a battery level and the like of the UE 100.

In step S105, the eNB 200 having received the WLAN measurement report from the UE 100 determines whether or not to offload traffic of the UE 100. For example, the eNB 200, when the load level of the eNB 200 exceeds a threshold, determines to offload the traffic of the UE 100. Alternatively, when communication quality between the UE 100 and the eNB 200 deteriorates or when the movement speed of the UE 100 is sufficiently slow and the battery level of the UE 100 is sufficient, the eNB 200 may determine to offload the traffic of the UE 100. Hereinafter, the following description will be given on the assumption that the eNB 200 has determined to offload the traffic of the UE 100.

In step S106, the eNB 200 determines whether to select AP 300 of an optimal offload destination or maintain communication with the eNB 200 on the basis of the radio link status based on the WLAN measurement report, and a network status concerning the eNB 200 and/or AP 300 (hereinafter simply referred to as a "network status"). The network status indicates a load level (that is, degree of congestion) of the AP 300 (or the eNB 200). Alternatively, the network status may indicate communication capability of the AP 300 (or the eNB 200). The communication capability includes whether QoS guarantee (WMM) is possible or not possible. Furthermore, a specific example of a determination algorithm for prioritizing APs 300 will be described later.

In step S107, the eNB 200 transmits, to the UE 100, an offloading order to the selected AP 300. The offloading order includes AP identifier of the AP 300 selected by the eNB 200. The offloading order may include information indicating the type of traffic (a bearer) to be offloaded.

In step S108, the UE 100 starts offload to the AP 300 selected by the eNB 200 according to the offloading order from the eNB 200. Furthermore, when the UE 100 is not connected yet to the AP 300 selected by the eNB 200, the UE 100 starts offload after connecting to the AP 300.

(2) Operation Pattern 2

Figure 9:
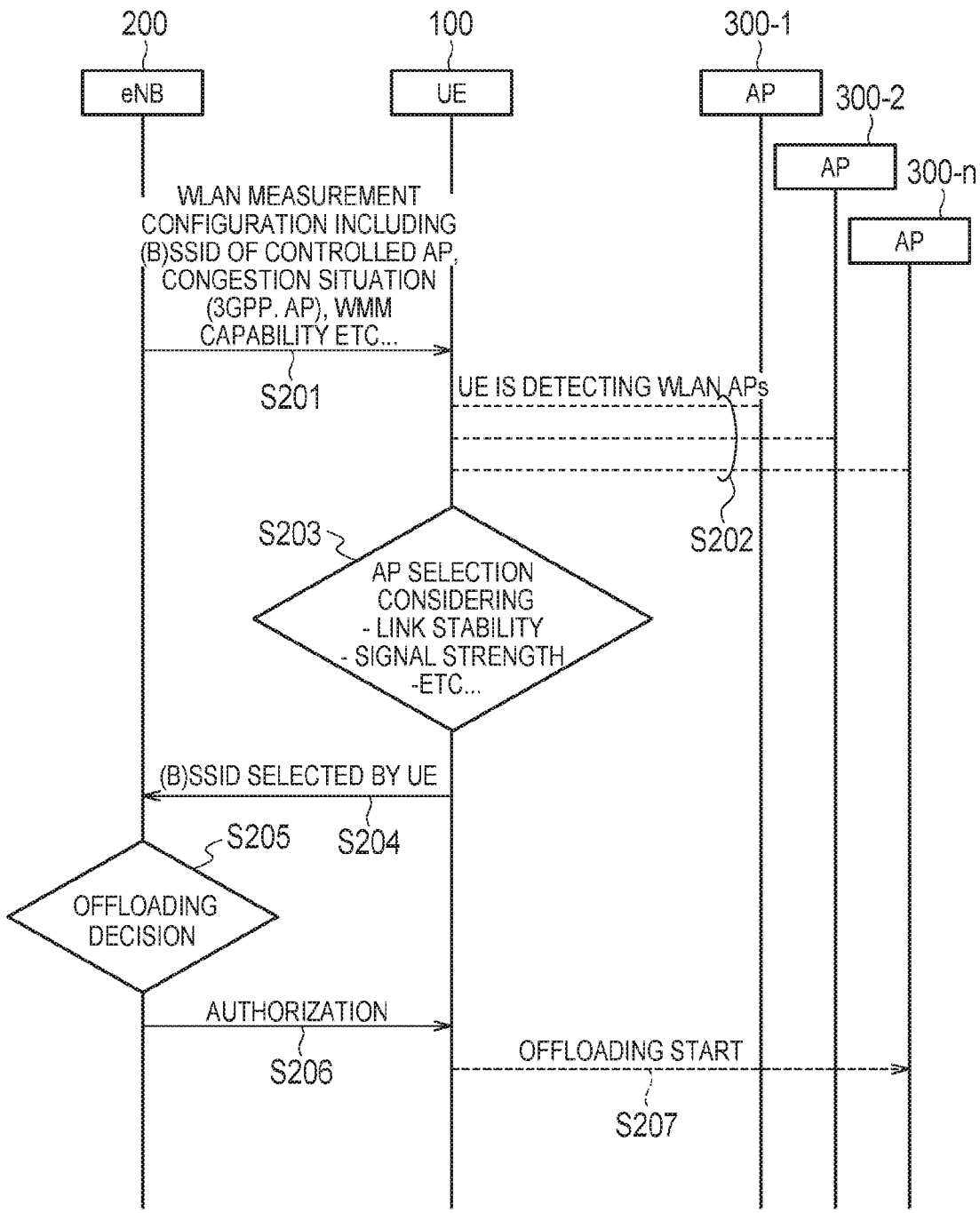
FIG. 9 is a sequence diagram of an operation pattern 2 according to the first embodiment.

FIG. 9 is a sequence diagram of the operation pattern 2. Hereinafter, a description overlapping that of the operation pattern 1 will be omitted.

As illustrated in FIG. 9, in step S201, the eNB 200 transmits WLAN measurement configuration information to the UE 100. In the operation pattern 2, the eNB 200 controls the WLAN measurement configuration information to include a network status and transmits the WLAN measurement configuration information to the UE 100. In this way, the network status is notified to the UE 100.

In step S202, the UE 100 detects APs 300 on the basis of AP identifiers included in the WLAN measurement configuration information.

In step S203, the UE 100 performs wireless LAN measurement according to the WLAN measurement configuration information. Then, the UE 100 determines whether to select AP 300 of an optimal offload destination or maintain communication with the eNB 200 on the basis of a radio link status between the UE 100 and detected APs 300 and a network status notified from the eNB 200.

In step S204, the UE 100 further includes a step of notifying the eNB 200 of information on the selected AP 300. The information on the selected AP 300 may indicate AP identifier of the AP 300.

In step S205, the eNB 200 determines whether or not to offload traffic of the UE 100. Hereinafter, the following description will be given on the assumption that the eNB 200 has determined to offload the traffic of the UE 100.

In step S206, the eNB 200 notifies the UE 100 of offload authorization" to the AP 300 selected by the UE 100.

In step S207, the UE 100 starts offload to the selected AP 300 in response to the offload authorization from the eNB 200.

Furthermore, in the present sequence, the process of step S205 may not necessarily be performed.

(3) Operation Pattern 3

Figure 10:
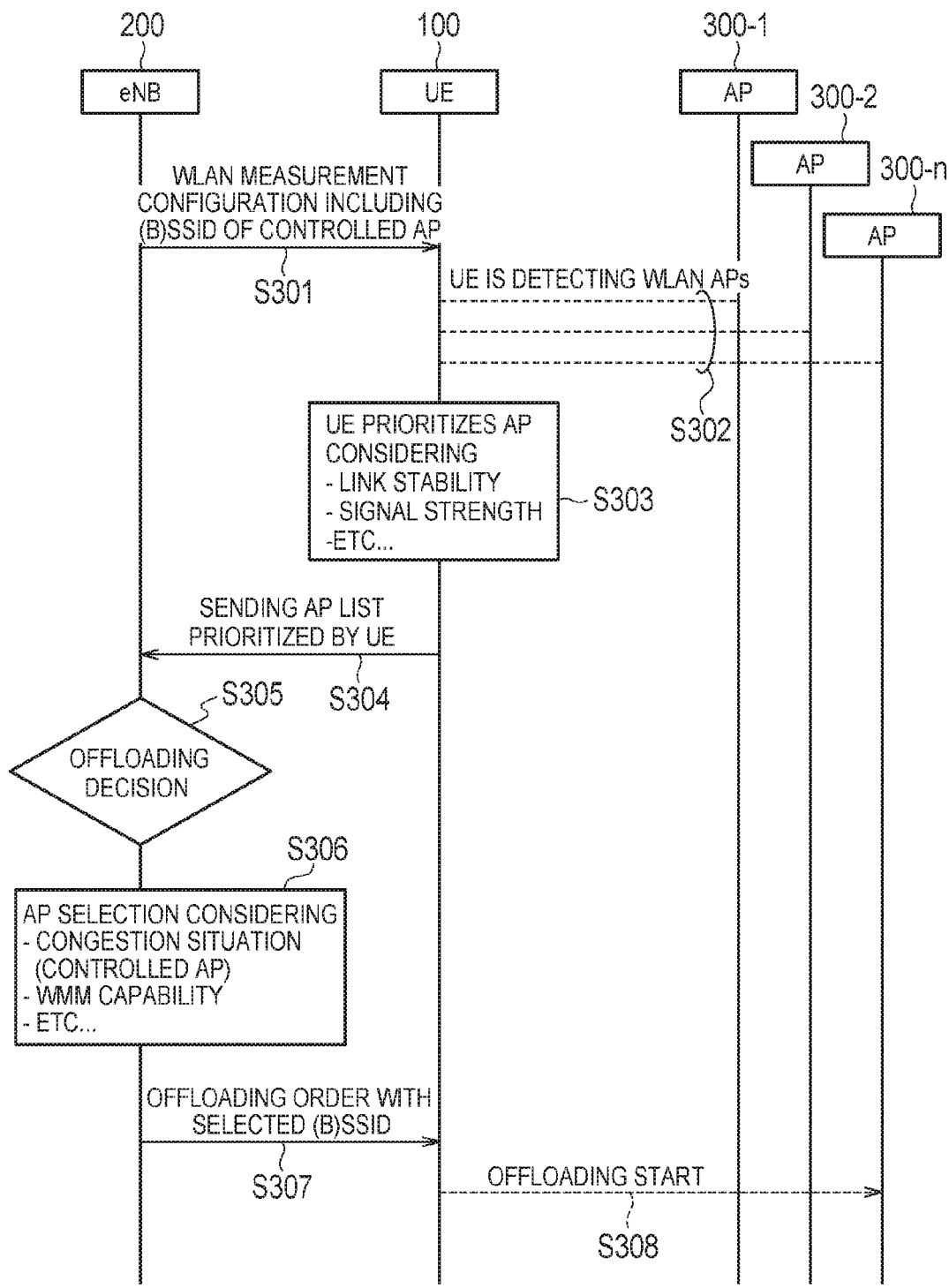
FIG. 10 is a sequence diagram of an operation pattern 3 according to the first embodiment.

FIG. 10 is a sequence diagram of the operation pattern 3. Hereinafter, a description overlapping that of the operation patterns 1 and 2 will be omitted.

As illustrated in FIG. 10, in step S301, the eNB 200 transmits WLAN measurement configuration information to the UE 100.

In step S302, the UE 100 detects APs 300 on the basis of AP identifiers included in the WLAN measurement configuration information.

In step S303, the UE 100 performs wireless LAN measurement according to the WLAN measurement configuration information. Then, on the basis of a radio link status between the UE 100 and the detected APs 300, the UE 100 calculates priority in which each of the detected APs 300 is employed as a transition destination of traffic. Furthermore, the UE 100 considers whether to advance offload in consideration of a movement speed or a battery level of the UE 100, and also prioritizes a cellular network (the eNB 200).

In step S304, the UE 100 transmits priority information on the calculated priority to the eNB 200. Specifically, the UE 100 transmits, to the eNB 200, a list (hereinafter referred to as a "priority list") in which AP identifiers are arranged according to the calculated priority.

In step S305, the eNB 200 determines whether or not to offload traffic of the UE 100. Hereinafter, the following description will be given on the assumption that the eNB 200 has determined to offload the traffic of the UE 100.

In step S306, on the basis of the priority list and a network status, the eNB 200 determines whether to select AP 300 of an optimal offload destination or maintain communication with the eNB 200.

In step S307, the eNB 200 transmits, to the UE 100, an offloading order to the selected AP 300.

In step S308, the UE 100 starts offload to the AP 300 selected by the eNB 200 according to the offloading order from the eNB 200.

(4) Operation Pattern 4

Figure 11:
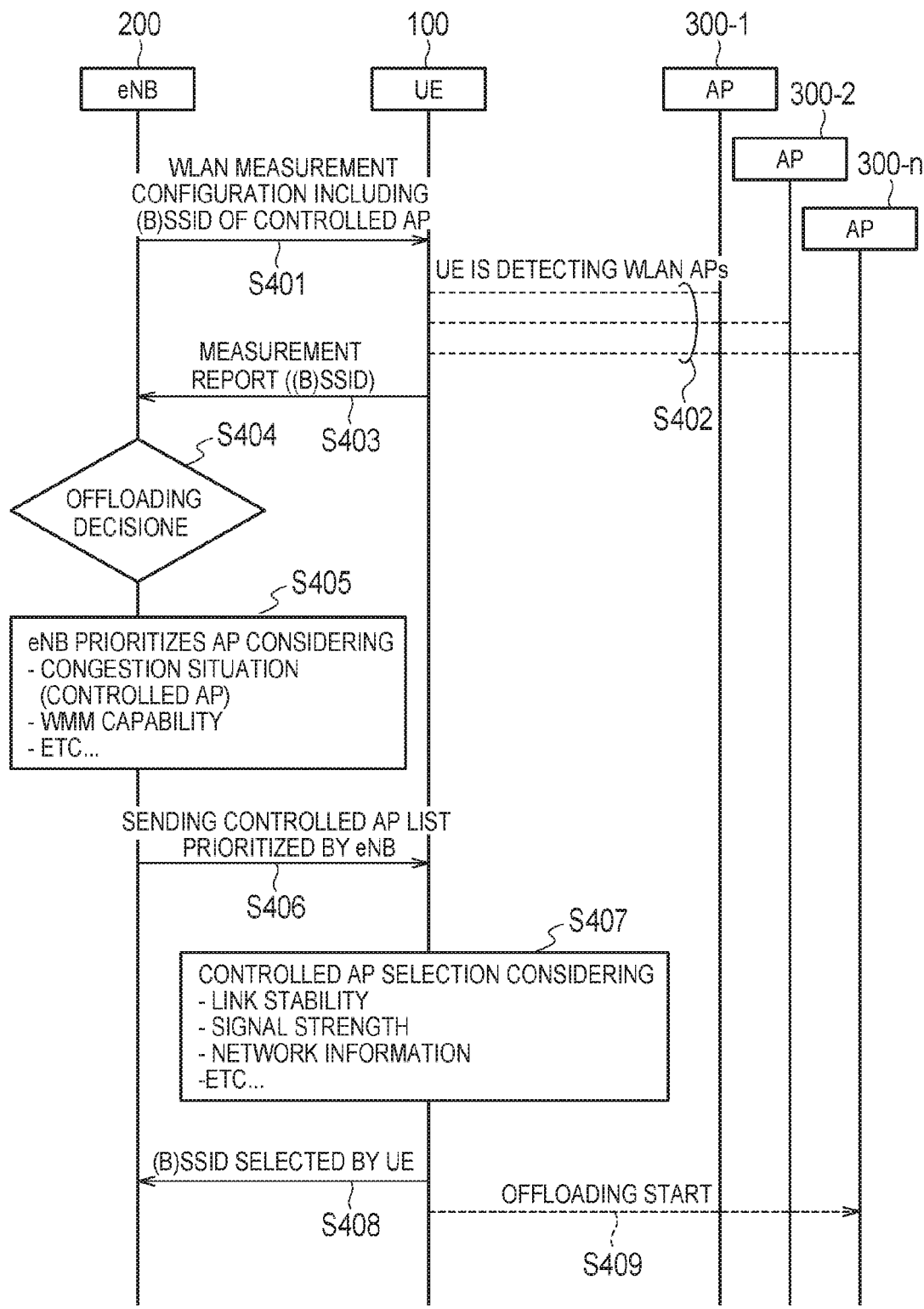
FIG. 11 is a sequence diagram of an operation pattern 4 according to the first embodiment.

FIG. 11 is a sequence diagram of the operation pattern 4. Hereinafter, a description overlapping that of the operation patterns 1 to 3 will be omitted.

As illustrated in FIG. 11, in step S401, the eNB 200 transmits WLAN measurement configuration information to the UE 100.

In step S402, the UE 100 detects APs 300 on the basis of AP identifiers included in the WLAN measurement configuration information.

In step S403, the UE 100 performs wireless LAN measurement according to the WLAN measurement configuration information. Then, the UE 100 associates the AP identifiers with a measured radio link status (signal strength of a beacon signal, radio link stability and the like), and transmits a WLAN measurement report including the radio link status and the AP identifiers to the eNB 200. Furthermore, the UE 100 may control the WLAN measurement report to include information on a movement speed, a battery level and the like of the UE 100.

In step S404, the eNB 200 determines whether or not to offload traffic of the UE 100. Hereinafter, the following description will be given on the assumption that the eNB 200 has determined to offload the traffic of the UE 100.

In step S405, on the basis of the radio link status based on the WLAN measurement report, and a network status, the eNB 200 calculates priority in which each of the APs 300 (the AP identifiers) included in the WLAN measurement report is employed as a transition destination of traffic. The priority may also include the eNB 200. In addition, in step S404 and/or step S403, the eNB 200 may take the movement speed, the battery level and the like of the UE 100 into consideration.

In step S406, the eNB 200 transmits a priority list to the UE 100 on the basis of the calculated priority.

In step S407, on the basis of the priority list and the radio link status, the UE 100 selects AP 300 of an optimal offload destination.

In step S408, the UE 100 notifies the eNB 200 of the AP identifier of the selected AP 300.

In step S409, the UE 100 starts offload to the selected AP 300.

(5) Operation Pattern 5

Figure 12:
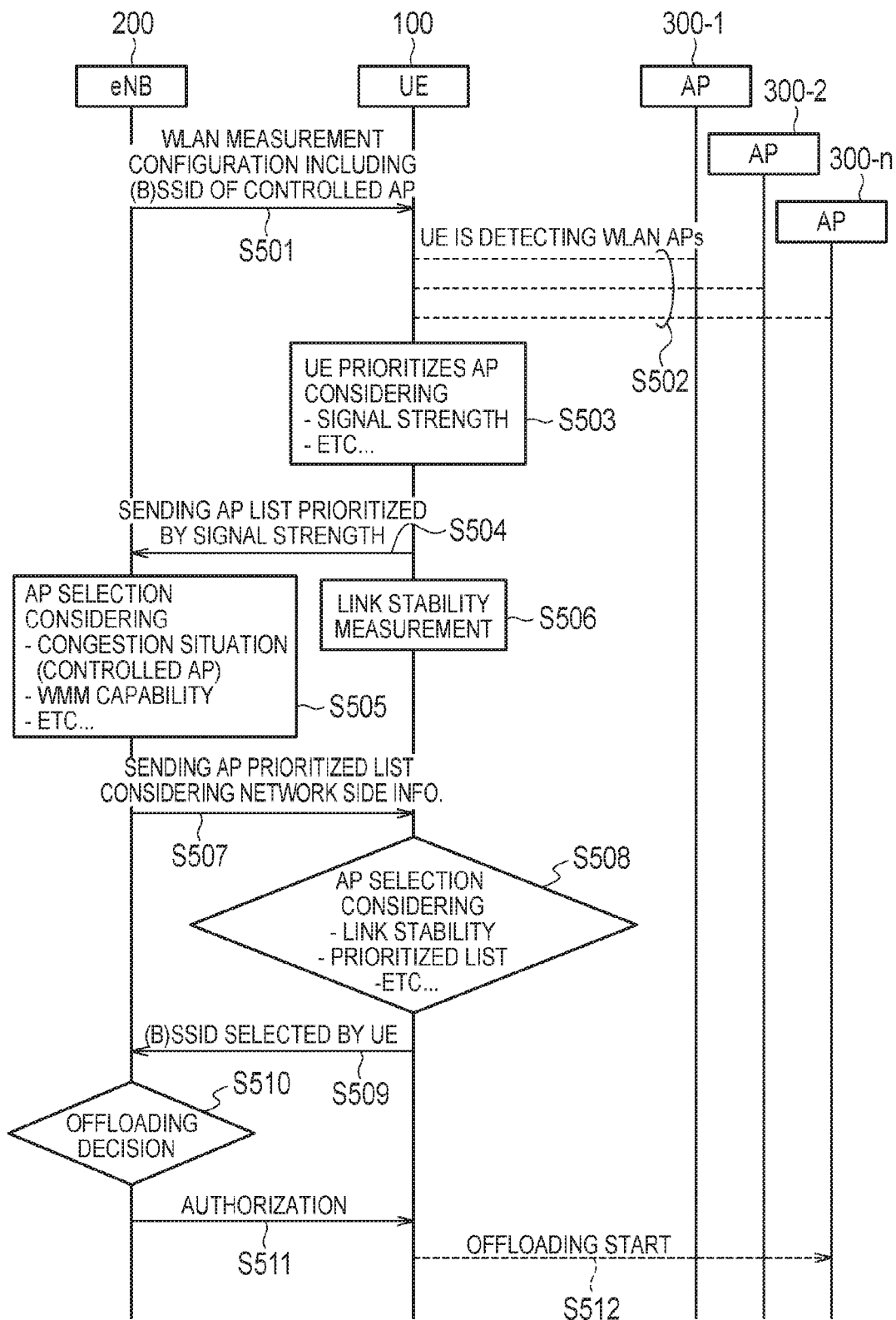
FIG. 12 is a sequence diagram of an operation pattern 5 according to the first embodiment.

FIG. 12 is a sequence diagram of the operation pattern 5. Hereinafter, a description overlapping that of the operation patterns 1 to 4 will be omitted.

As illustrated in FIG. 12, in step S501, the eNB 200 transmits WLAN measurement configuration information to the UE 100.

In step S502, the UE 100 detects APs 300 on the basis of AP identifiers included in the WLAN measurement configuration information.

In step S503, the UE 100 performs wireless LAN measurement according to the WLAN measurement configuration information. The UE 100 measures signal strength of a beacon signal of a radio link status. Then, on the basis of the measured signal strength, the UE 100 calculates priority in which each of the detected APs 300 is employed as a transition destination of traffic.

In step S504, the UE 100 transmits a priority list to the eNB 200 on the basis of the calculated priority.

In step S505, on the basis of the priority list from the UE 100 and a network status, the eNB 200 updates the priority list from the UE 100 such that the network status is reflected.

In step S506, the UE 100 performs the wireless LAN measurement again. The UE 100 measures radio link stability of the radio link status.

In step S507, the eNB 200 transmits the updated priority list to the UE 100.

In step S508, on the basis of the priority list from the eNB 200 and the measured radio link stability, the UE 100 determines whether to select AP 300 of an optimal offload destination or maintain communication with the eNB 200. At this time, a battery level and the like of the UE 100 may be considered.

In step S509, the UE 100 notifies the eNB 200 of the AP identifier of the selected AP 300.

In step S510, the eNB 200 determines whether or not to offload traffic of the UE 100. Hereinafter, the following description will be given on the assumption that the eNB 200 has determined to offload the traffic of the UE 100.

In step S511, the eNB 200 notifies the UE 100 of offload authorization to the AP 300 selected by the UE 100.

In step S512, the UE 100 starts offload to the selected AP 300 in response to the offload authorization from the eNB 200.

Furthermore, in the present sequence, the process of step S510 may not necessarily be performed. Furthermore, in the present sequence, the prioritization is performed twice in total (steps S503 and S505); however, the prioritization may be performed three times or more.

(6) Operation Pattern 6

Figure 13:
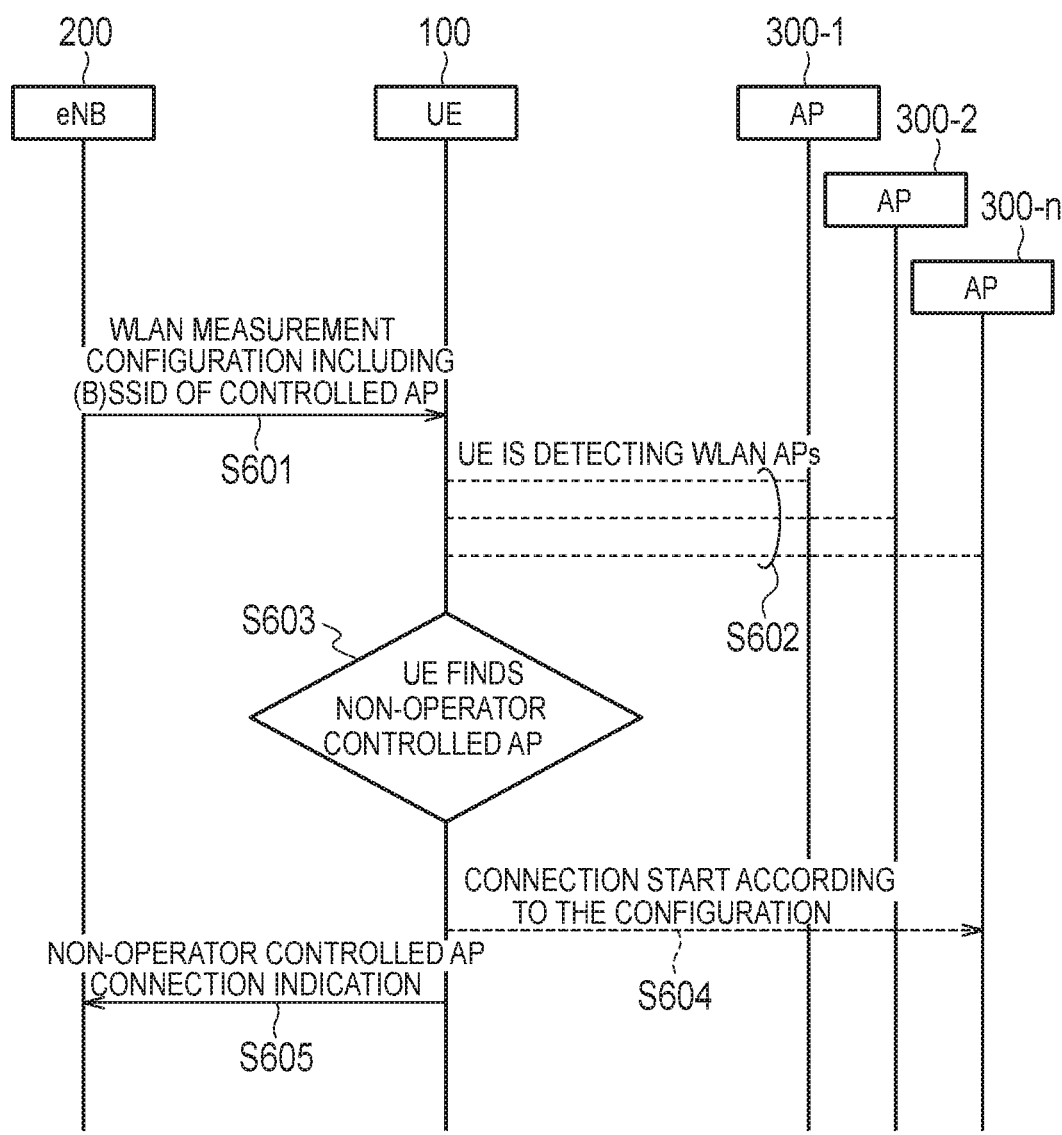
FIG. 13 is a sequence diagram of an operation pattern 6 according to the first embodiment.

FIG. 13 is a sequence diagram of the operation pattern 6. Hereinafter, a description overlapping that of the operation patterns 1 to 5 will be omitted.

As illustrated in FIG. 13, in step S601, the eNB 200 transmits WLAN measurement configuration information to the UE 100. In the operation pattern 6, the WLAN measurement configuration information further includes at least any one piece of information of the following 1) to 3) in order to control an operation of the UE 100 when the UE 100 discovers AP (Non-operator controlled AP) not controlled by an operator.

1) Information indicating whether the UE 100 leaves traffic in cellular communication when the UE 100 is connected to the Non-operator controlled AP (for example, whether to leave voice data such as a telephone or data other than E-mail) For example, when a load level of the eNB 200 is high (congested), it is preferable not to leave traffic in the cellular communication.

2) Information indicating whether or not to notify the eNB 200 of the UE 100 being connected to the Non-operator controlled AP.

3) Information indicating whether or not to continuously search (scan) an Operator controlled AP when the UE 100 is connected to the Non-operator controlled AP.

In step S602, the UE 100 detects APs 300 on the basis of AP identifiers included in the WLAN measurement configuration information.

In step S603, the UE 100 detects the Non-operator controlled AP and connects to the Non-operator controlled AP.

In step S604, the UE 100 starts a connection to the AP 300 (the Operator controlled AP) on the basis of the information of 3) described above.

In step S605, the UE 100 transmits, to the eNB 200, a notification indicating that the UE 100 is connected to the Non-operator controlled AP. However, when the notification is rendered unnecessary by the information of 2) described above, the process of step S604 may not be performed.

(7) Radio Link Stability

The radio link stability indicates the degree of stability of a radio link between the UE 100 and the AP 300. Hereinafter, specific examples 1 to 4 of the radio link stability will be described.

Figure 14:
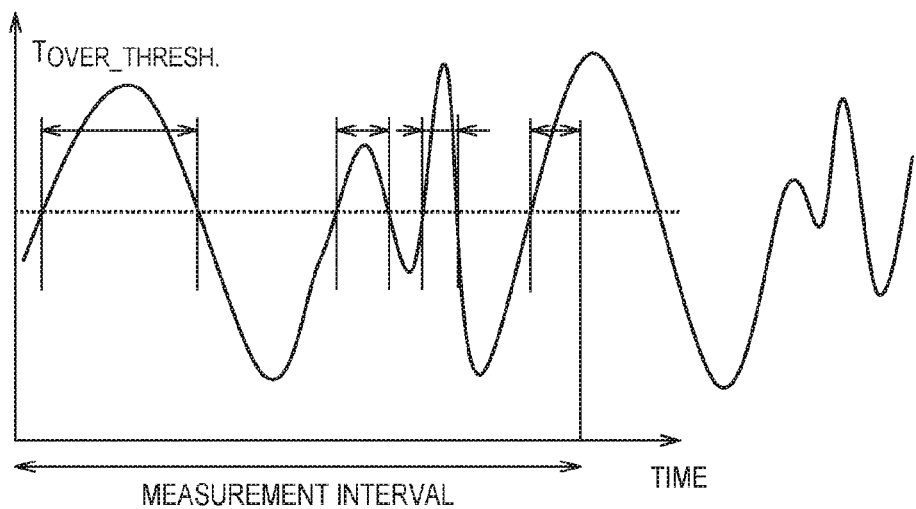
FIG. 14 is a diagram for illustrating a specific example 1 of radio link stability according to the first embodiment.

FIG. 14 is a diagram for illustrating the specific example 1 of the radio link stability. As illustrated in FIG. 14, in the specific example 1, the UE 100 measures a time (Tover_thresh.) for which the signal strength of a beacon signal exceeds a threshold, and acquires, as the radio link stability, a value of the longest Tover_thresh. in a measurement interval or an average value of Tover_thresh. in the measurement interval.

Figure 15:
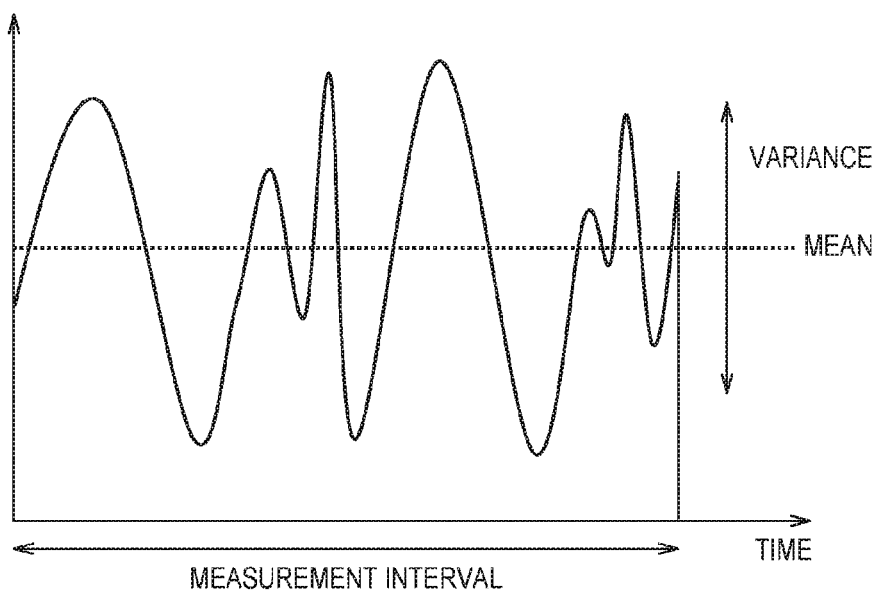
FIG. 15 is a diagram for illustrating a specific example 2 of radio link stability according to the first embodiment.

FIG. 15 is a diagram for illustrating the specific example 2 of the radio link stability. As illustrated in FIG. 15, in the specific example 2, the UE 100 acquires variance of the signal strength of a beacon signal in a measurement interval as the radio link stability.

In the specific example 3, the UE 100 acquires a ratio of desired wave signals out of received signals as the radio link stability. For example, the UE 100 acquires (the reception strength of a beacon signal corresponding to a desired BSSID)/(signal strength in the same frequency band) as the radio link stability.

In the specific example 4, the UE 100 acquires, as the radio link stability, the number of times by which signals from BSSID of the AP 300 to be measured (all signals including a beacon signal) are received in a measurement interval. For example, the UE 100 acquires, as the radio link stability, (the number of times by which a signal corresponding to a desired BSSID is received)/the measurement interval. Since AP 300 dealing with heavy traffic frequently transmits signals, it is possible to regard a radio link as being stable when the number of receptions is small.

Furthermore, in the specific examples 1 to 4, the UE 100 is able to measure the radio link stability for all APs 300, however, the UE 100 may measure the signal strength of the beacon signal, then select AP 300 with high signal strength, connect to the selected AP 300, and measure the radio link stability only for the AP 300. For example, the UE 100 may transmit a connection confirmation message to the connected AP 300, measure a passage rate, and measure the radio link stability. Then, when the measured radio link stability satisfies a condition, the UE 100 may transmit a report to the eNB 200.

(8) WLAN Measurement Report

The WLAN measurement report, which is transmitted from the UE 100 to the eNB 200, includes the radio link status (the signal strength of the beacon signal, the radio link stability and the like) and the AP identifiers. The radio link status is not indicated by an immediate value but is indicated by an index value in each fixed range, so that it is possible to reduce overhead.

FIG. 16 is a configuration diagram of a mapping table according to the present embodiment. The mapping table is shared between the eNB 200 and the UE 100.

As illustrated in FIG. 16, the mapping table is a table in which measured values of the radio link status are associated with index values. The UE 100 converts the measured values to the index values with reference to the mapping table, and controls the WLAN measurement report to include the index values.

(9) Determination Algorithm

An example of a determination algorithm for prioritizing APs 300 will be described. FIG. 17 is a diagram for illustrating an example of the determination algorithm.

As illustrated in FIG. 17, the UE 100 or the eNB 200 performs weighting calculation with respect to each index value of a determination parameter (a radio link status, a network status and the like) for each AP, thereby being able to determine an optimal AR For example, the UE 100 or the eNB 200 calculates an evaluation value for each AP by the following calculation formula and sets priority to be high in descending order of the evaluation value.

$$(\text{Load level})*\text{LoadWeight}+(\text{Signal strength level}+\text{Link stability level})*\text{LinkWeight}$$

[Modification of First Embodiment]

The UE 100 may transmit the WLAN measurement report to the eNB 200 together with a cellular measurement report that is a report of a measurement result for the eNB 200 and (a neighboring eNB).

In the above-described embodiments, the WLAN transceiver 112 of the UE 100 is assumed to be in an operation state (an ON state); however, it may be possible to employ an operation considering the case in which the WLAN transceiver 112 is in a stop state (an OFF state). For example, the UE 100 may transmit, to the eNB 200, information indicating whether or not the WLAN transceiver 112 is in the operation state, and the eNB 200 may transmit WLAN measurement configuration information only to the UE 100 including the WLAN transceiver 112 in the operation state.

Alternatively, even when the UE 100 including the WLAN transceiver 112 in the stop state receives the WLAN measurement configuration information from the eNB 200, the UE 100 may ignore the WLAN measurement configuration information. Furthermore, the UE 100 may hold the WLAN measurement configuration information when ignoring the WLAN measurement configuration information, and start measurement with reference to the WLAN measurement configuration information when the WLAN transceiver 112 transitions to the operation state.

In the above-described embodiments, as one example of the cellular communication system, the LTE system is described; however, the present disclosure is not limited to the LTE system, and the present disclosure may be applied to systems other than the LTE system.

When it is determined whether to perform offload to the WLAN 30 or to stay in the cellular network (the E-UTRAN 10), the determination may be made in consideration not only of a power consumption status of the UE 100 (brightness setting of a screen, a reduction speed of a battery level, and the like) but also of the battery level. The battery level may be determined by percentage, may be determined by using a threshold and the like, or may be weighted, be included into other parameters and the like of radio field strength, and may be subject to comprehensive evaluation.

Second Embodiment

The second embodiment will be described while focusing on the differences from the first embodiment. In the second embodiment, the case, in which the UE 100 has a decision right of an access network in a network selection operation, will be mainly assumed.

[Overview of Second Embodiment]

A network selection control method according to the second embodiment is a method of controlling a network selection operation that is an operation of selecting an access network that houses traffic of the UE 100, from the cellular RAN (the E-UTRAN 10) and the WLAN 30.

Figure 18A:
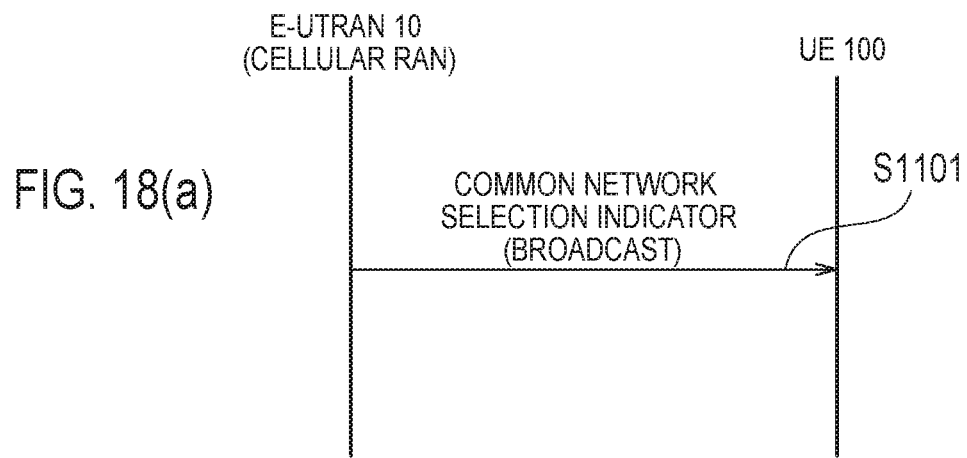
[FIGS. 18(a) and 18(b)]
Figure 18B:
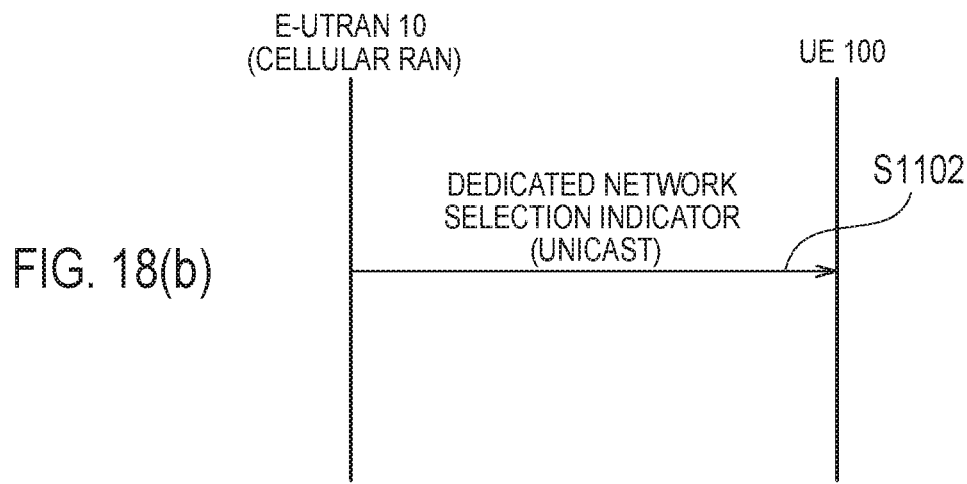

FIGS. 18(*a*) and 18(*b*) are diagrams illustrating a network selection control method according to the second embodiment.

As illustrated in FIGS. 18(*a*) and 18(*b*), the network selection control method according to the second embodiment includes step S1101 (step A) of transmitting a common network selection indicator for configuring ON or OFF of the network selection operation from the E-UTRAN 10 (the cellular RAN) in a broadcast manner, and step S1102 (step B) of transmitting a dedicated network selection indicator for configuring ON or OFF of the network selection operation from the E-UTRAN 10 in a unicast manner.

As described above, the network selection indicator (Access Network Selection Indicator) for configuring the ON or OFF of the network selection operation is transmitted from the cellular RAN to the UE 100, so that it is possible to control ON or OFF of the network selection operation in the UE 100 without notifying the UE 100 of a load status and the like of the cellular RAN.

In addition, the common network selection indicator may be included into SIB (System Information Block). On the other hand, the dedicated network selection indicator may be included into an RRC Connection Reconfiguration message or an RRC Connection Release message. The RRC Connection Release message corresponds to a connection release request.

In the second embodiment, the common network selection indicator is applied to UE 100 in an idle state and UE 100 in a connected state. The dedicated network selection indicator is applied only to the UE 100 in a connected state.

Alternatively, the common network selection indicator is applied only to the UE 100 in an idle state. The dedicated network selection indicator is applied only to the UE 100 in a connected state.

(Operation Pattern 1)

Figure 19:
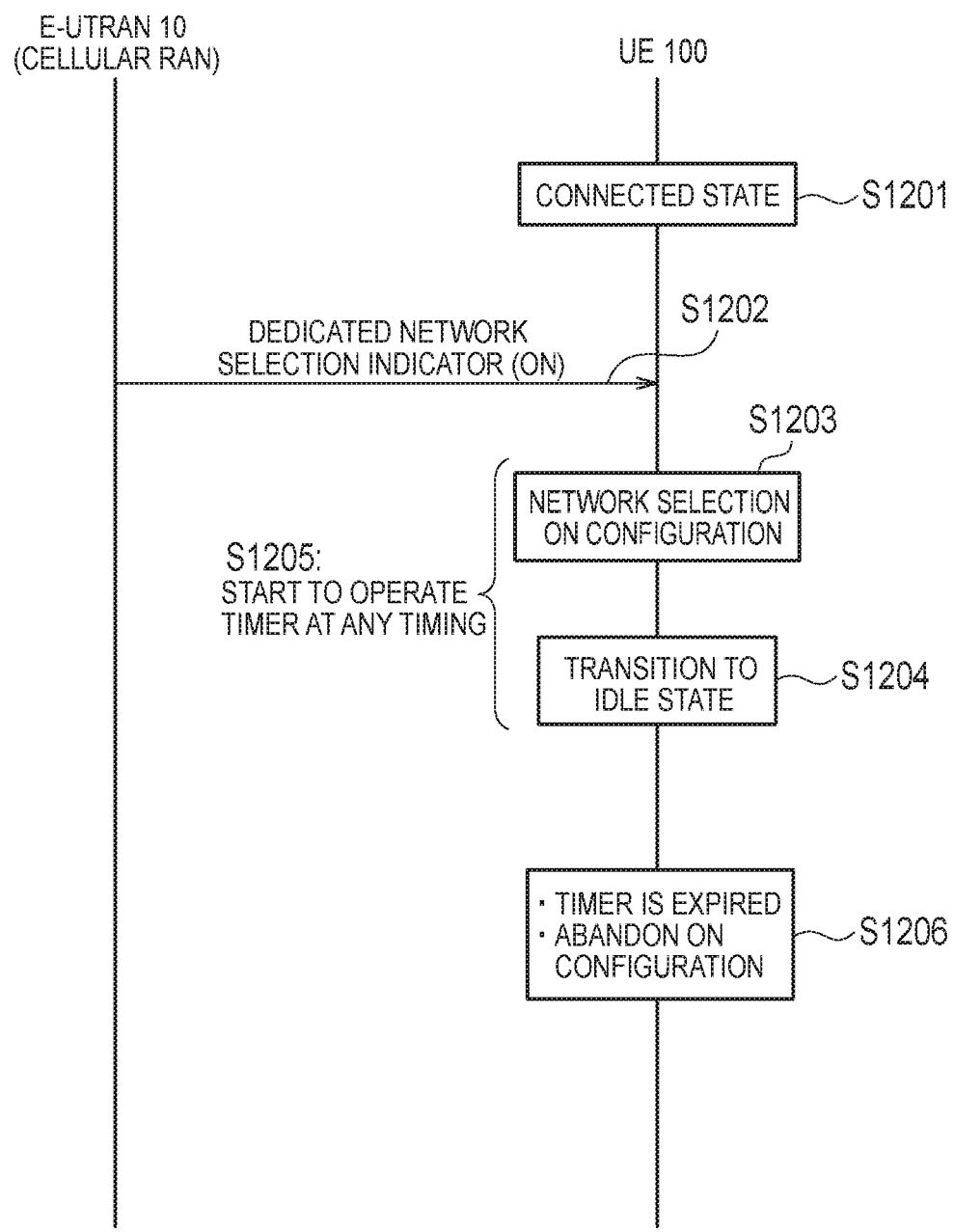
FIG. 19 is a sequence diagram of an operation pattern 1 according to the second embodiment.

FIG. 19 is a sequence diagram of an operation pattern 1 according to the second embodiment. In an initial state of the present sequence, as illustrated in step S1201, the UE 100 is in a state of having established a connection with a cell (the eNB 200) included in the E-UTRAN 10. The UE 100 has a timer.

As illustrated in FIG. 19, in step S1202, the E-UTRAN 10 controls the dedicated network selection indicator for configuring the network selection operation to ON to be included into the RRC Connection Reconfiguration message, and transmits the RRC Connection Reconfiguration message to UE 100 in a connected state.

In step S1203, the UE 100 having received the dedicated network selection indicator (the network selection operation: ON), configures the network selection operation to ON. In this way, the UE 100 starts the selection of an appropriate access network that houses the traffic of the UE 100, from the E-UTRAN 10 and the WLAN 30.

In step S1204, the UE 100 transitions from the connected state to the idle state.

In step S1205, the UE 100 starts to operate the timer when the UE 100 configures the network selection operation to ON (step S1203) or transitions to the idle state (step S1204). The timer is used to specify a time for which the ON Configuration of the network selection operation should be maintained.

The UE 100 having transitioned from the connected state to the idle state, maintains the ON configuration of the network selection operation until the timer is expired.

In step S1206, the UE 100 abandons the ON configuration of the network selection operation when the timer is expired.

As described above, in the operation pattern 1 according to the second embodiment, even the UE 100 having transitioned to the idle state, operates according to the dedicated network selection indicator in the time corresponding to the timer. Thus, even when the common network selection indicator indicates OFF, it is possible to continue the network selection operation according to the dedicated network selection indicator indicating ON.

Furthermore, the operation pattern 1 according to the second embodiment describes the case in which the network selection operation is intentionally maintained to ON; however, the network selection operation may be intentionally changed to be maintained to OFF. In this case, in the sequence of the operation pattern 1 according to the second embodiment, "ON" is regarded as "OFF". In this way, even in the case in which the common network selection indicator indicates ON, it is possible to operate the UE 100 according to the dedicated network selection indicator indicating OFF.

(Operation Pattern 2)

Figure 20:
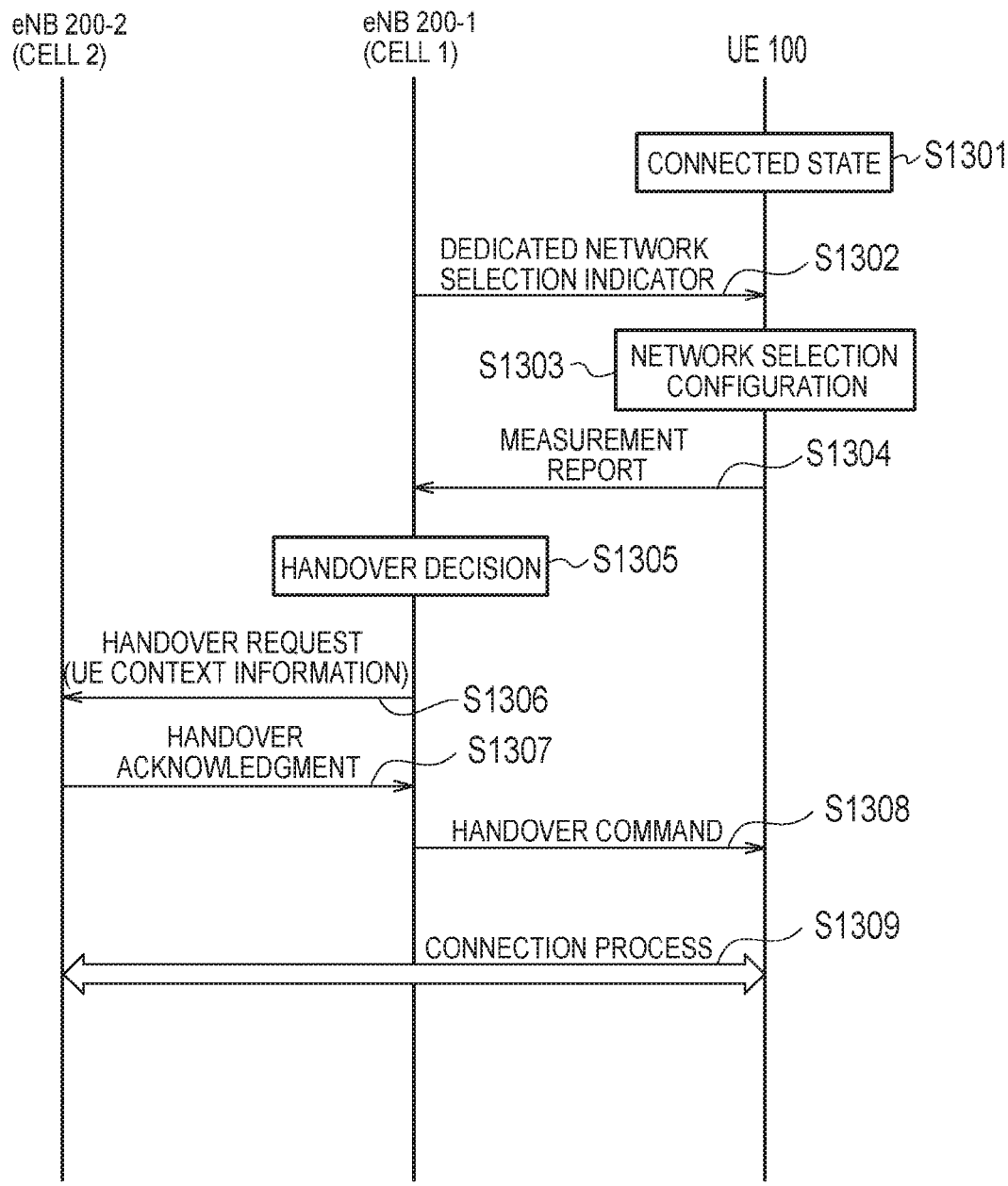
FIG. 20 is a sequence diagram of an operation pattern 2 according to the second embodiment.

FIG. 20 is a sequence diagram of an operation pattern 2 according to the second embodiment. In an initial state of the present sequence, as illustrated in step S1301, the UE 100 is in a state of having established a connection with a cell 1 (eNB 200-1) included in the E-UTRAN 10.

As illustrated in FIG. 20, in step S1302, the cell 1 (the eNB 200-1) included in the E-UTRAN 10 controls the dedicated network selection indicator to be included into the RRC Connection Reconfiguration message, and transmits the RRC Connection Reconfiguration message to UE 100 that connects to the cell 1.

In step S1303, the UE 100 having received the dedicated network selection indicator, configures the network selection operation to ON or OFF according to the dedicated network selection indicator.

In step S1304, the UE 100 transmits a measurement report to the cell 1. The measurement report, for example, includes each of measurement results of the serving cell (the cell 1) and a neighboring cell (a cell 2) in the E-UTRAN 10.

In step S1305, the cell 1 (the eNB 200-1) having received the measurement report, decides handover of the UE 100 to the cell 2 on the basis of the received measurement report.

In step S1306, the cell 1 (the eNB 200-1) transmits a handover request including context information of the UE 100 to the cell 2 (eNB 200-2). The context information is information on various configurations of the UE 100. The context information includes the dedicated network selection indicator transmitted from the cell 1 to the UE 100 in step S1302.

As described above, the context information including the dedicated network selection indicator is transferred from the cell 1 to the cell 2. In this way, the cell 2 (the eNB 200-2) is able to recognize the network selection configuration of the UE 100.

In step S1307, the cell 2 (the eNB 200-2) having received the handover request, transmits a handover acknowledgment (ACK) to the cell 1 (the eNB 200-1).

In step S1308, the cell 1 (the eNB 200-1) having received the handover acknowledgment, transmits, to the UE 100, a handover command that instructs handover to the cell 2.

In step S1309, the UE 100 having received the handover command, performs a connection process with the cell 2.

The cell 2 (the eNB 200-2) having received the context information, determines whether or not a change in the dedicated network selection indicator (that is, the network selection configuration of the UE 100) included in the context information is necessary on the basis of the load status of the cell 2. For example, when OFF is configured in the UE 100 and the load level of the cell 2 (the eNB 200-2) is high, it is determined to change the OFF configuration to the ON configuration.

When it is determined that such a change is necessary, the cell 2 (the eNB 200-2) transmits a changed dedicated network selection indicator (for example, the network selection operation: ON) to the UE 100. In addition, the cell 2 (the eNB 200-2) may transmit the changed dedicated network selection indicator to the UE 100 when the UE 100 performs the connection process in step S1309.

As described above, in the operation pattern 2 according to the second embodiment, even when the UE 100 performs handover, a target cell (the cell 2) is able to recognize the network selection configuration of the UE 100. Thus, the target cell (the cell 2) performs determination regarding whether or not to change the network selection configuration of the UE 100, and can change the network selection configuration according to necessity.

(Operation Pattern 3)

Figure 21:
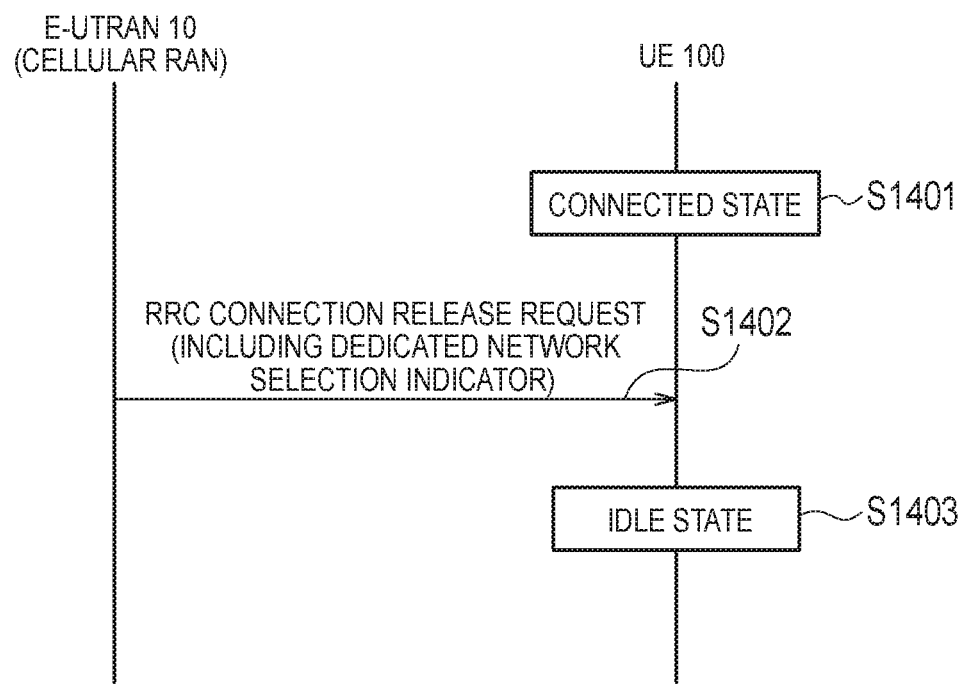
FIG. 21 is a sequence diagram of an operation pattern 3 according to the second embodiment.

FIG. 21 is a sequence diagram of the operation pattern 3 according to the second embodiment. In an initial state of the present sequence, as illustrated in step S1401, the UE 100 is in a state of having established a connection with the cell (the eNB 200) included in the E-UTRAN 10.

As illustrated in FIG. 21, in step S1402, the cell included in the E-UTRAN 10 transmits the RRC Connection Release message including the dedicated network selection indicator to the UE 100. The UE 100 having received the RRC Connection Release message, configures the network selection operation to ON or OFF according to the dedicated network selection indicator included in the RRC Connection Release message. Then, in step S1403, the UE 100 releases an RRC connection and transitions from a connected state to an idle state.

As described above, in the operation pattern 3 according to the second embodiment, since the UE 100 configures the network selection operation to ON or OFF when transitioning to the idle state, it is possible to control the UE 100 in the idle state to operate according to the dedicated network selection indicator.

In addition, the UE 100 transitions to the idle state and then performs any one of the following operations.

1) The UE 100 maintains a configuration until the UE 100 reaches a next connected state and receives the dedicated network selection indicator.

2) Similarly to the above-described operation pattern 1 according to the second embodiment, the UE 100 maintains a configuration until the timer is expired, and operates according to the common network indicator received after the timer is expired.

Third Embodiment

The third embodiment will be described while focusing on the differences from the first and second embodiments.

In the third embodiment, an access network selection and a traffic steering based on RAN assistance information (parameters provided from RAN) will be described. The RAN assistance information may be broadcast or dedicated signaling.

(Overview of Third Embodiment)

Figure 22:
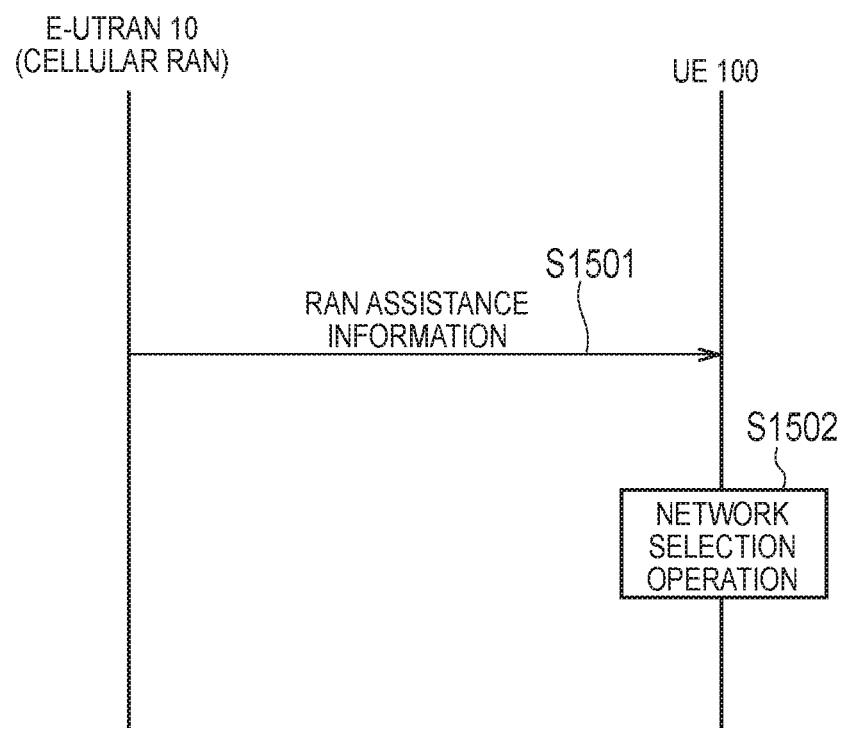
FIG. 22 is a diagram illustrating an overview of third embodiment.

FIG. 22 is a diagram illustrating an overview of third embodiment. A network selection control method according to the third embodiment embodiments is a method of controlling a network selection operation for selecting an access network in which traffic of UE 100 is exchanged from among E-UTRAN 10 (RAN) and WLAN 30.

As shown in FIG. 22, the network selection control method includes: a step A (S1501) of transmitting, by the E-UTRAN 10, RAN assistance information utilized for the network selection operation; a step B (S1501) of receiving, by the UE 100, the RAN assistance information; and a step C (S1502) of performing, by the UE 100, the network selection operation based on the RAN assistance information. The RAN assistance information includes predetermined information for determining whether or not the selection of the WLAN 30 is permitted. The predetermined information is associated with a load status of the E-UTRAN 10.

The predetermined information is an indicator indicating whether or not the selection of the WLAN 30 is permitted. In the step A, the E-UTRAN 10 updates the indicator in accordance with the load status of the E-UTRAN 10. In the step C, the UE 100 determines whether or not the selection of the WLAN 30 is permitted, based on the indicator.

Alternatively, the predetermined information is a reference value indicating a probability that the selection of the WLAN 30 is permitted. In the step A, the E-UTRAN 10 updates the reference value in accordance with the load status of the E-UTRAN 10. In the step C, the UE 100 determines whether or not the selection of the WLAN 30 is permitted in accordance with whether a random number generated at the UE 100 exceeds the reference value.

Alternatively, the predetermined information is a threshold with which a status regarding the E-UTRAN 10 or the WLAN 30 is compared. In the step A, the E-UTRAN 10 updates the threshold in accordance with the load status of the E-UTRAN 10. In the step C, the UE 100 determines whether or not the selection of the WLAN 30 is permitted by comparing the status with the threshold.

Here, the "status" is at least one of: a radio status of the WLAN 30, a load status of the WLAN 30, and a radio status of the E-UTRAN 10.

In the third embodiments, in the step C, the UE 100 selects the WLAN 30 when the selection of the WLAN 30 is permitted based on the predetermined information and a WLAN 30 status is good.

In the embodiments, in the step C, the UE 100 selects the E-UTRAN 10 when the selection of the WLAN 30 is not permitted based on the predetermined information.

In the step C, the UE 100 selects the E-UTRAN 10 when the WLAN 30 status is poor, irrespective of the predetermined information.

In the step C, the UE 100 selecting the WLAN 30 is controlled not to transfer additional traffic to the WLAN 30, when the selection of the WLAN 30 is not permitted based on the predetermined information.

In the step C, the UE 100 not selecting the WLAN 30 is controlled not to select the WLAN 30, when the selection of the WLAN 30 is not permitted based on the predetermined information.

In the third embodiments, the step A comprises: a step of transmitting first RAN assistance information from the E-UTRAN 10 by a broadcast; and a step of transmitting second RAN assistance information from the E-UTRAN 10 by a unicast. The step B comprises: a step of receiving, by the UE 100, the first RAN assistance information; and a step of receiving, by the UE 100, the second RAN assistance information. When a first parameter included in the first RAN assistance information and a second parameter included in the second RAN assistance information are overlapped, the UE 100 preferentially applies the second parameter than the first parameter.

(Network Selection Operation)

RAN rules are applied to operator controlled WLAN which identifiers are provided by RAN if ANDSF is not supported. The access network selection consists of RAN condition part and WLAN condition part.

FIG. 23 is a diagram illustrating a concept of RAN rule. As shown in FIG. 23, the UE 100 selects the WLAN 30 when RAN status is poor and WLAN status is good. The UE 100 selects the E-UTRAN 10 (hereinafter referred to as "RAN" if appreciate) when RAN status is good or WLAN status is poor, without selecting the WLAN 30. The target WLAN is prioritized in the list of identifier, the selection is performed in order of the list.

To achieve bi-directional load balancing, access network selection must be properly controlled. The procedure of the access network selection should be based at least on the RAN's load condition and WLAN's load condition. The RAN should be able to provide the most up-to-date load information to the UE and RAN rules should make use of the information. Signal strength of WLAN may also be used.

Providing direct load information (e.g. percentage of the load level) is the simplest way. However, many operators prefer not to provide direct load information to UE. Instead, the offload intention may be realized using the following options.

Option 1: Explicit indicator (1 bit), which is also referred to as WTSI (WLAN Traffic Steering Indicator).

Option 2: Adjustment of RAN parameter (e.g., RAN threshold).

Option 3: Using both Option 1 and Option 2.

UE 100 should first check whether the RAN wants the UE 100 to offload to WLAN either using an explicit indicator or the RAN threshold, then the WLAN condition is evaluated if the offload to WLAN is granted.

The solution is applicable to UEs in RRC IDLE and RRC CONNECTED states for E-UTRAN, UE IDLE mode for UTRAN and CELL_FACH, CELL_PCH, URA_PCH and CELL_DCH states for UTRAN. This means RAN assistance parameters are at least provided via SIB. Note that if the UE's WLAN radio is OFF, the UE 100 may discard the access network selection since RAN cannot override the user's preference to turn off the WLAN radio.

(Explicit Indicator)

Explicit indicator may be realized in more than one way. Below, three sub-options (Option 1a, 1b, 1c) may be described.

FIG. 24 is a diagram illustrating the Option 1a. As shown in FIG. 24, RAN provides an explicit indicator along with WLAN related parameters (e.g., WLAN load, WLAN signal threshold) to the UE. If the RAN's load is high, the RAN may set the explicit indicator to ON. This indicates to the UE 100 that selection to WLAN is acceptable. And UEs 100 within WLAN coverage should select WLAN as long as the WLAN condition is good (as determined by the appropriate WLAN parameters from the RAN assistance parameters and UE implementation). If the RAN's load returns to normal (e.g., low load), RAN may toggle the explicit indicator to OFF to indicate to the UE 100 that all traffic should be steered back to the RAN. Additionally, the UE may steer traffic back to RAN if the WLAN condition is poor, even if the explicit indicator is set to ON to prevent service interruption.

One of the main problems with option 1a is the potential for mass toggling. This is especially the case when the indicator is set to OFF. All UEs 100 may steer traffic back to the RAN at the same time causing RAN congestion once again.

FIG. 25 is a diagram illustrating the Option 1b. As shown in FIG. 25, the UE's behavior with Option 1b is very similar to Option 1a. There is no difference in terms of offloading to WLAN. The main difference is in the way the UE steers traffic back to RAN. With Option 1b, traffic is steered back to RAN only if WLAN condition deteriorates below the acceptable level. This means even if the Explicit Indicator is set to OFF, the UE 100 does not need to steer traffic back to RAN if the WLAN condition is good. This is in contrast with Option 1a whereby the UE 100 is requested to steer traffic back to RAN if the Explicit Indicator is set to OFF regardless of the WLAN condition.

If the RAN desires more traffic to be steered back to the RAN even when the Explicit Indicator is already set to OFF, the RAN may adjust the WLAN related threshold (e.g., lower the WLAN load threshold) to increase the likelihood that more UEs will steer traffic back to the RAN.

Option 1c is simply the option to increase the number of bits for the Explicit Indicator in Option 1a and Option 1b from 1-bit to multiple bits. If the Explicit Indicator is represented by multiple bits, the RAN will have more flexibility to adjust the number of UEs that get offloaded to WLAN. For example, the 2-bit indicator may be represented by {100, 75, 25, 0}. 100 and 0 are equivalent to the ON and OFF indicator as in Options 1a/1b. If the indicator is set to 75, the RAN expects 75% of the UEs 100 will consider offloading to WLAN. Random number generation within the UE 100 may be used to determine whether offloading to WLAN is accepted. With Option 1c, all UEs 100 will have equal likelihood of offloading to WLAN. That way all WLAN APs within the RAN coverage will be utilized evenly and WLAN congestion would be minimized.

With all 3 sub-options, RAN can further refine the selection of UEs for offloading by sending dedicated signaling with Indicator set to ON even if the broadcasted indicator is set to OFF. This may further prevent mass toggling.

(Adjusting RAN Parameter)

FIG. 26 is a diagram illustrating the Option 2. As shown in FIG. 26, the threshold is adjusted for bi-directional load balancing.

With Option 2, the RAN may provide the RAN signal threshold (e.g. RSRP) as a parameter to be adjusted. The threshold may be set higher when the RAN load increases. Offloading to WLAN may be promoted since more UEs 100 will satisfy the higher RAN signal threshold comparison test.

FIG. 27 is a diagram illustrating an offload to WLAN by RAN signal threshold. As shown in FIG. 27, with this option 2, UEs 100 near the edge of cell's coverage will always be offloaded first to WLAN. This means UEs 100 near the center of the cell may have less opportunity to steer their traffic to WLAN. However, such UEs 100 may have better throughput since capacity of the RAN should be improved.

The problem with this option is that operator controlled WLANs near the center of the cell will have less chance to be utilized. WLAN resources are not well balanced. The use of dedicated signaling is one way to reduce this imbalance, but it requires that the RAN knows which UEs 100 are not offloaded by broadcast signaling. With Option 2, the RAN does have the option to allow all UEs initiate network selection towards WLAN by setting the RAN threshold to infinity. This would be equivalent to setting the Explicit Indicator to ON in Option 1. And RAN also has the option to allow the UEs to return to RAN by setting the RAN threshold to a very low value (e.g., − infinity). This will be equivalent to setting the Explicit Indicator to OFF in Option 1.

As a solution of the issue that only WLANs deployed in cell edge are utilized, dedicated signaling can be used. As other benefit of dedicated signaling, high loaded UE, which uses a lot of resources or gold subscriber's UE can be controlled in a different fashion. However considering optimal parameters per UE is burdensome for RAN node. It may not be preferable for providing all the same parameters via dedicated signaling. So it may be better just to provide indicator or threshold of infinite value to control such UEs.

(Options 1 and 2)

Both Option 1 and Option 2 have their unique benefits. It should be further discussed if it would be reasonable to adopt both options in order to maintain sufficient flexibility for the RAN. It is proposed that adopting one of the above options as the mechanism for bi-directional load balancing.

(Providing Assistance Parameters Via Broadcast and/or Dedicated Signaling)

As discussed above, it is assumed that RAN can switch value of the indicator and/or adjusting RAN assistance parameter depending on its load condition.

For access network selection, RAN should have the flexibility to satisfy the following network selection conditions.

1. RAN should be able to indicate to all UEs 100 (both IDLE and CONN) to trigger network selection.

2. RAN may select specific UEs to trigger network selection.

3. It is not expected that RAN would only select IDLE UEs for network selection.

Currently, it is assumed that both broadcast and dedicated signaling may be used for triggering network selection. This means RAN may provide both broadcast RAN assistance parameters and dedicated RAN assistance parameters to the same UE 100. In general, broadcast parameters is useful since the coverage size of WLAN is smaller than the macro cell, since it is difficult for the RAN to know which UE 100 is within proximity of WLAN coverage. Dedicated parameters have the advantage that the RAN can configure a specific UE for access network selection (e.g., based on the UE's resource usage in the RAN). Therefore, the two provided parameters do not serve the same purpose and may even be set differently. Therefore, it is considered whether broadcast parameters and dedicated parameters should be applicable to both IDLE UEs and CONN UEs so that UE's behavior can be better understood. It should be already clear that dedicated signaling is applicable for specific UEs 100 so the main question is whether the broadcast parameters should be applicable to all UEs 100 or just the IDLE UEs. There are 2 candidate options.

i) Broadcast RAN Parameters are Only Applicable to IDLE UEs.

With this option, it would be clear which signaling mechanism is applicable to which type of UEs 100. This option would prevent any need to resolve any conflict for UEs receiving both types of parameters. Although this option can satisfy the 3 conditions stated above, it may result in excessive signaling. For example, if the RAN wants all UEs 100 to try and select WLAN, RAN will need to broadcast the explicit indicator/adjusted parameter and also send dedicated explicit indicator/adjusted parameter to all CONN UEs.

ii) Broadcast RAN Parameters are Applicable to all UEs.

With this option, the UE 100 behavior needs to be well defined since the CONN UEs may receive RAN parameters from either the broadcast signaling or dedicated signaling or both. However, this option does have the benefit that a single broadcast parameters can satisfy condition 1 above. For condition 2, the RAN may decide not to send broadcast parameter. Instead, RAN may send dedicated signaling to selective UEs 100 (e.g., based on resource usage) for offloading. This option is useful when the RAN's load is moderate (e.g., middle) or when RAN's load is increasing gradually. Furthermore, providing the parameters to specific UEs 100 may help to avoid mass toggling.

Therefore, it is preferable that Broadcast RAN parameters are applicable to all UEs, Idle and Connected.

Since option ii) may result in the condition that the UE received parameters from both broadcast signaling and dedicated signaling, it is necessary to consider the interaction between the two types of parameters. Basically RAN assistance parameters via dedicated signaling should override RAN assistance parameters via broadcasted signaling if the same parameters are provided, since RAN may have specific reason(s) for configuring network selection for a specific UE 100. RAN assistance parameters via dedicated signaling should override broadcast RAN assistance parameters.

Fourth Embodiment

The fourth embodiment will be described while focusing on the differences from the first to third embodiments.

In the fourth embodiment, a use method of the RAN assistance parameters, especially, an operation of steering traffic from WLAN back to RAN and details of access network selection rule will be described.

(Overview of Fourth Embodiment)

A network selection control method according to a fourth embodiment is a method of controlling a network selection operation for selecting an access network in which traffic of UE 100 is exchanged from among E-UTRAN 10 (RAN) and WLAN 30. The network selection control method includes: a step A of steering, by the UE 100, the traffic from the E-UTRAN 10 to the WLAN 30; and a step B of steering, by the UE 100, the traffic back to the E-UTRAN 10 based on at least one of a load status of the E-UTRAN 10 and a load status of the WLAN 30.

In the embodiments, in the step B, the UE 100 steers the traffic back to the E-UTRAN 10 when the E-UTRAN 10 is a low load status.

Alternatively, in the step B, the UE 100 steers the traffic back to the E-UTRAN 10 when the WLAN 30 is a high load status.

Alternatively, in the step B, the UE 100 steers the traffic back to the E-UTRAN 10 when the E-UTRAN 10 is a low load status and the WLAN 30 is a high load status.

Alternatively, in the step B, the UE 100 steers the traffic back to the E-UTRAN 10 when the E-UTRAN 10 is a low load status or the WLAN 30 is a high load status.

In the fourth embodiment, the UE 100 has a specific function capable of exchanging multiple traffics with both the WLAN 30 and the E-UTRAN 10 at the same time. In the step B, the UE 100 steers traffic back to the E-UTRAN 10 and will not keep any traffic in the WLAN 30 when a criteria to steer traffic back to the E-UTRAN 10 is satisfied.

In the fourth embodiment, the specific function is an ISRP (Inter-System Routing Policy) function.

(WLAN RSPI/WLAN RSNI)

FIG. 28 is a diagram illustrating an example of use method of RAN assistance parameters in LTE. FIG. 29 is a diagram illustrating an example of use method of RAN assistance parameters in UMTS.

FIGS. 28 and 29 include 3GPP agreed RAN parameters but do not show how they are used for access network selection. In particular, it is important to determine whether "&& (AND)" or "|| (OR)" is used to combine the assistance parameters. Before, the specific rules are considered for access network selection, it is necessary to consider all the assistance parameters that are already agreed and those that are still under discussion; otherwise, it would be difficult to study any rules while certain parameters are still considered FFS. The threshold of the BSS Load is already agreed as one of the RAN signalled assistance parameters. This will allow the eNB 200 the flexibility to steer traffic bi-directionally based on the loading condition in both RAN and WLAN. Therefore, bssLoad should be a parameter to be considered in direction from WLAN to RAN.

In addition to BSS Load, it will be considered whether the thresholds related to WLAN signal strength (i.e., RCPI and RSNI) need to be signalled by the RAN as one of the assistance parameters. In principle, RAN has better mobility robustness than WLAN due to the coverage size; therefore, access network selection from WLAN to RAN should be carefully considered. For example, it should be reasonable to assume that the UE 100 would be allowed to steer traffic back to 3GPP if signal strength of WLAN is weak. If RAN can also control the signal strength threshold of WLAN, additional flexibility for controlling access network selection is possible (similar to RAN's control of RSRP/RSRQ). Therefore, WLAN RCPI and WLAN RSNI should be a RAN assistance parameter.

(Selection Rules)

FIG. 30 is a diagram illustrating simplest rule for LTE. FIG. 31 is a diagram illustrating simplest rule for UMTS.

As shown in FIGS. 30 and 31, simplest rule for both RAN rules and enhanced ANDSF is: the direction from 3GPP RAN to WLAN: using "AND STATEMENT", and The direction from WLAN to 3GPP RAN: using "OR STATEMENT". With this rules, the RAN may provide the RAN signal threshold (RSRP (LTE)/CPICH RSCP (UMTS), RSRQ (LTE)/CPICH Ec/No (UMTS)) as a parameter to be adjusted. As described in the fourth embodiment, the RAN signal threshold may be set higher when the RAN load increases. The RAN threshold may be set infinity and negative infinity.

Since load balancing is achieved with this adjustment, OPI (1-bit, or multi-bit) is not needed for load balancing. OPI can be used for subscriber classification. However it is doubtful how to use it in roaming case. Subscriber class may differ per operator. One possibility is that all roaming UEs are categorized to the highest/lowest class (e.g. gold/bronze).

(Problems with Simple Rules)

FIG. 32 is a diagram illustrating problems with simple rules. Provided values of RAN assistance parameters may vary with SIB update. Then, a lot of UEs 100 may potentially steer their traffics to RAN at the same time since the conditions shown in FIG. 32 are fulfilled.

Figure 33:
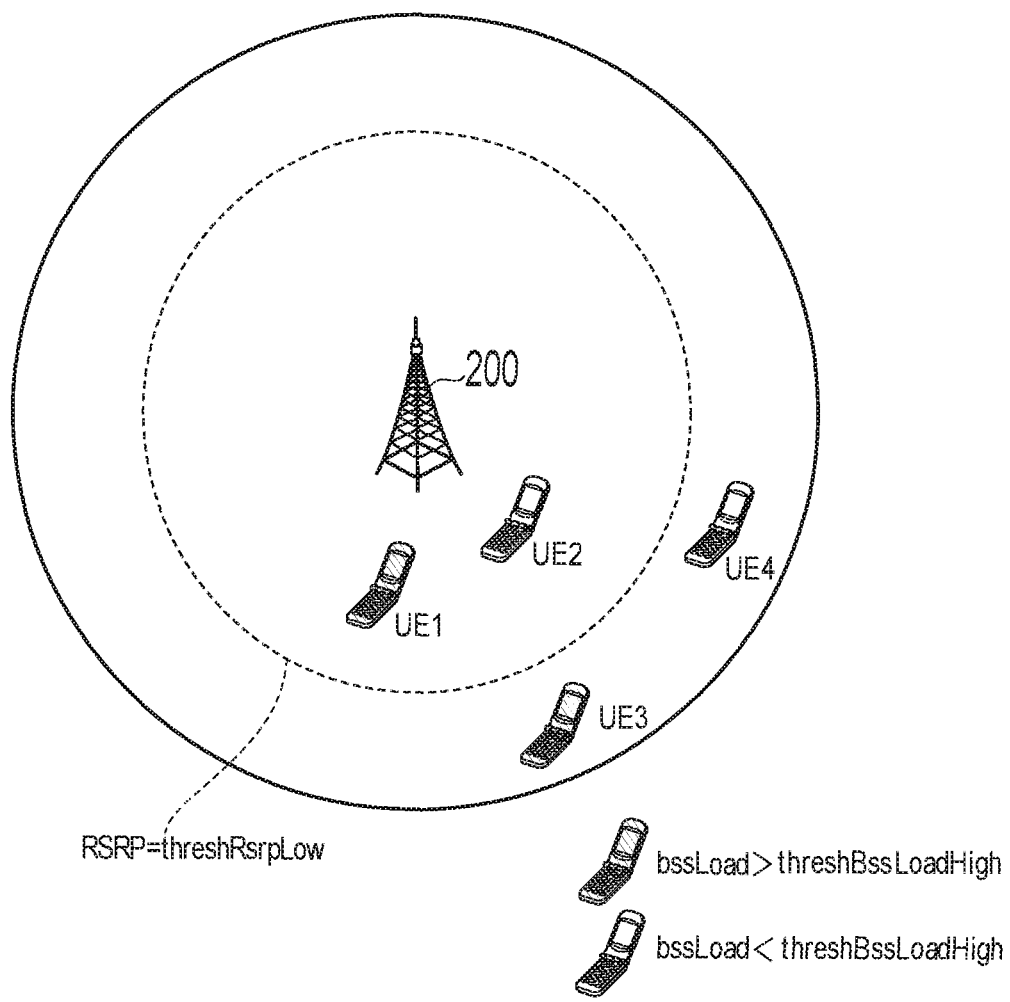
FIG. 33 is a diagram illustrating a case where traffic is steered from WLAN back to RAN.

To allow the RAN to control the steering of traffic back to RAN, we should consider options under RAN's control from the load perspective. FIG. 33 is a diagram illustrating a case where traffic is steered from WLAN back to RAN. As shown in FIG. 33, we consider the case for using thresholds for RSRP and BSS load. RSRP may be generalized to include RSRQ etc.

Option 1: Only RSRP is used to determine the steering of traffic back to RAN (3GPP) based on the following criterion:

If (Rsrp>threshRsrpLow), UE moves traffic from WLAN to 3GPP

Option 1 means only UE1 and UE2 in FIG. 33 will be moved from WLAN to RAN (3GPP). The benefit for using RSRP threshold is that the RAN can begin to move only UEs close to the center of the cell so that overall throughput may not change drastically and mass toggling may be prevented. However, Option 1 also implies that UE3 which is connected to an overloaded WLAN AP cannot move back to 3GPP even though it is within coverage of the RAN.

Option 2: Only BSS load is used to determine the steering of traffic back to 3GPP based on the following criterion:

If (bssLoad>threshBssLoadHigh), UE moves traffic from WLAN to 3GPP

Option 2 means UE1 and UE3 in FIG. 33 will be moved from WLAN to 3GPP. The implication is that all UEs within the RAN coverage will be move back to 3GPP as long as the BSS load condition is met, and the RAN will not be able to move only UEs close to the center of the cell based on RSRP.

Option 3: Both BSS load and RSRP are used together based on the following criterion:

If (Rsrp>threshRsrpLow) && (bssLoad>threshBssLoadHigh), UE moves traffic from WLAN to 3GPP With Option 3, both condition for RSRP and BSS load must be satisfied before the UE is moved back to 3GPP. With reference to FIG. 33, only UE1 is moved from WLAN to 3GPP. This means the RAN cannot target UEs near the center of the cell (i.e., UE2 is not moved) and also some UEs that experiences WLAN congestion is also missed (i.e., UE3).

Option 4: Both BSS load and RSRP are used together based on the following criterion:

If (Rsrp>threshRsrpLow)||(bssLoad>threshBssLoadHigh), UE moves traffic from WLAN to 3GPP With Option 4, UE1, UE2 and UE3 in FIG. 33 are all moved from WLAN to 3GPP.

From the UE perspective, if WLAN is congested and it's within RAN's coverage (assuming the UE is at least attached to the RAN while connected to WLAN), the UE should have the option to move back to 3GPP so that the user experience will not be adversely impacted. This means Option 1 and Option 3 should be ruled out. With regards to the comparison between Option 2 and Option 4, Option 4 includes the possibility of selecting UEs that are near the center of the cell. However, Option 4 cannot select only UEs that are near the center of the cell, so the benefit of using RSRP cannot be realized. Therefore, it is simpler to just adopt Option 2 as the baseline.

FIG. 34 illustrates a selection rule for adopting Option 2. The selection rule shown in FIG. 34 is very similar to the rule shown in FIG. 31. There is no difference in terms of offloading to WLAN. The main difference is in the way the UE steers traffic back to RAN. With this rule, traffic is steered back to RAN only if WLAN condition deteriorates below the acceptable level. This means even if (Rsrp>threshRsrpHigh)||(Rsrq>threshRsrqHigh), the UE does not need to steer traffic back to RAN if the WLAN condition is good. If the RAN desires more traffic to be steered back to the RAN, the RAN may adjust threshRcpi and/or threshRcpi to increase the likelihood that more UEs will steer traffic back to the RAN. Received level of RCPI/RSNI changes per UE, this rule does not result in mass toggling. The rule described in FIG. 34 should be adopted.

(ISMP, ISRP)

For the offloading of traffic from RAN to WLAN it has been decided that the traffic to be steered will be based on APN level when ANDSF is not available, and for the case ANDSF is available the traffic to be steered should be according to ANDSF rule. It is, however, unclear how traffic should be selected for steering when the UE moves from WLAN to RAN. For UEs that are only ISMP capable all traffic should be steered to RAN since the UE has no option to have traffic on both RAN and WLAN. If the UE is only ISMP capable, and if the rule for access network selection dictates that the UE should move traffic from WLAN to RAN, all traffic shall be moved to RAN.

For ISRP capable UEs, it may be possible to steer only some traffic to RAN while keeping the remaining traffic in WLAN. However, the simplest way is to make sure that all traffics are steered back to RAN even for ISRP capable UEs. It can be possible to avoid increase of UE power consumption for the UE connected to two access networks. Whether all traffic should be steered to RAN may be up to UE implementation.

[Additional Statements]

Hereinafter, additional statements for the above-described embodiments will be described.

[Additional Statement 1]

1. Introduction

The primary focus is to better understand the scenarios used by the operators to offload services from 3GPP network to WLAN deployed and controlled by operators and their partners. Both collocated and non-collocated scenarios for WLAN/3GPP nodes were considered essential. With better clarity of the intended scenarios it is now possible to consider solutions for these scenarios. However, full details of offloading procedures are considered, it is necessary to get a better understanding of some elements that form the foundation of any good solution. In particular, the information necessary for offloading and which entity should be considered, the UE or the NW, that is responsible for coordinating the exchange of the information. This additional statement 1 provides some suggestions on these elements that are critical to offloading success.

2. Discussion

Additional detailed scenarios for collocated and non-collocated scenarios should also be considered. These include cases where the coverage involves one or more overlapping WLAN and 3GPP nodes. In all cases, the scenarios of interest always include coverage of both WLAN and 3GPP nodes otherwise offloading would not be possible. The idea of offloading isn't new and has been studied under eICIC, HetNet, CA and currently under small cell enhancement discussion. But unlike offloading to small 3GPP nodes, the information exchange between 3GPP node and WLAN node isn't well defined from the RAN perspective. Furthermore, it is unclear what information exchange is possible between 3GPP and WLAN nodes, especially if a standardized interface is not available.

2.1. Information Needed for Network Selection

In order to support offloading from 3GPP node to WLAN node, the 3GPP node must consider many factors that must be evaluated before the proper decision can be made for offloading. Examples of the basis for the offloading decision include the need to relieve congestion, the need to provide the UE with higher throughput or the need to satisfy certain QoS requirements for better user experience. Once the decision is made to attempt to offload the UE, the 3GPP network will need to consider which network and which node is most suitable for the offloading needs. Therefore, certain key information will need to be evaluated as part of the network selection process, otherwise, WLAN offloading won't be handled properly. Specifically, the following list of information is considered essential for network selection.

Access and backhaul load
Throughput
QoS
WLAN node Identification
Signal strength
Link stability
Support for WMM capabilities One of the main considerations for offloading is the need to relieve RAN/NW congestion. The WLAN access and backhaul load must be considered before deciding whether to offload the UE to WLAN, since there may be a need to retain the UE within the 3GPP node if the WLAN node is more congested than the 3GPP node. Even if neither network is not fully loaded, there may be a need to increase UE throughput to provide a better user experience and the opportunity to offload the UE to an alternate network could satisfy such a requirement. Similar concerns may be applied to QoS, since some services (e.g., delay tolerant services) may be more suitable for WLAN while other services (e.g., voice) may be more appropriate for 3GPP node.

One of the advantages of offloading is that not all active services need to be served by one network, which means it is an option to allow the UE to be connected to both networks simultaneously to optimize the QoS requirements. Such offloading decisions should be carefully considered since unnecessary simultaneous connections to both networks will result in undesired UE power consumption.

It will be necessary for the 3GPP node to identify the target WLAN node for offloading. The WLAN node's SSID, or more specifically BSSID, is a candidate for identification It will also be necessary to define the process for verifying the authenticity of the WLAN node before offloading.

Signal strength is one piece of information that is clearly needed to evaluate the possibility of offloading to a WLAN node. Just as in the case for mobility between 3GPP nodes, both the source signal strength and the target signal strength must be jointly considered.

Closely related to signal strength is the need to evaluate the link stability of the WLAN node. Link stability is a measure of how long the UE can remain connected to the WLAN node which is mainly dependent on the variations in signal strength. It may not be necessary for the UE to be connected to the WLAN node to obtain sufficient link stability information. And as such, UE's mobility also plays a role in how stable the connection will be. The number of WLAN nodes deployed in a region may also affect link stability at any given location. It is still FFS how we would define link stability and which entity defines this requirement.

Whether the WLAN and the UE support WMM. With WMM should also be considered it may be possible for the 3GPP node to receive the prioritized category of services supported by the WLAN. In particular, it may be possible to support voice service over WLAN. This could potentially offer the 3GPP node more options for offloading and reducing UE power consumption if the UE does not also need to be connected to the 3GPP node.

Proposal 1: The set of parameters essential to network selection should be decided.

2.2. Collocated Vs Non-Collocated Scenarios

Once the set of parameters from network selection is decided, whether there are any differences in obtaining network related parameters for both collocated and non-collocated scenarios should also be considered. For the collocated scenario, it may be assumed that much of the information exchange between the 3GPP node and WLAN node can be obtained through a proprietary interface since they are both located within the same node. In particular, information exchange including the access and backhaul load, management of throughput as well as QoS support can be transparently exchanged within the same node. As part of the extension of the collocated scenario, it should also be possible to support an external WLAN node physically separated from the 3GPP node but connected to the 3GPP node via a fibre optics link much like Scenario 4 among the CA deployment scenarios. These external WLAN nodes will also have similar information exchange capability as the collocated scenarios since the 3GPP node will have direct access to the external WLAN node without delay.

For the non-collocated scenario, it isn't clear if the throughput and access/backhaul load can be exchanged since a standardized interface is assumed to be unavailable. One possibility would be to obtain the load information through OAM as part of the network implementation. The latency associated with the information exchange should not be critical as long as the load does not change too quickly. If either of the backhaul loads is congested, it may be more difficult to exchange the information in a timely manner. Another possibility is to obtain the load information through the beacon frame transmitted periodically by the WLAN node or alternatively from the probe response frame. However, such load information may only reflect the access load and not the backhaul load.

With respect to radio link parameters, there should be no differences between collocated and non-collocated scenarios so all radio link parameters are assumed to be available for both scenarios.

Proposal 2: The parameters necessary for network selection should be available for both collocated and non-collocated scenarios.

2.3. Radio Link Parameters

As previously suggested, it is assumed that radio link parameters such as signal strength and link stability of WLAN node are readily available for either collocated or non-collocated scenarios. From a different perspective, radio link parameters such as signal strength are indications of the UE's pathloss from WLAN node. This pathloss is dependent on the location of the UE and whether the location is within coverage of the WLAN node. Therefore, it is conceivable that the 3GPP node could determine the UE's pathloss from the WLAN node if the 3GPP node can readily determine the location of the UE relative to that of the WLAN node. For the collocated scenario, since the location of the UE is the same relative to both of the nodes, it may be possible to estimate the pathloss from the WLAN node; however the actual implementation to determine the pathloss may not be straightforward as the frequency band and the antenna configuration between the 3GPP and WLAN will differ. The situation is even more complicated with the non-collocated scenario. The complexity involved in finding relative pathloss of the UE from a non-collocated WLAN node is prohibitive and may even require the UE to report location information. Also it should not be assumed that the location of the WLAN node is always known by the 3GPP node.

To arrive at a common solution for both the collocated and the non-collocated scenario, it would be much simpler to allow the UE to determine the radio link parameters and report these to the 3GPP node as needed. As described above, it is very challenging for the 3GPP node to determine the UE's WLAN signal strength, and this solution is consistent with the existing behaviour for mobility among 3GPP nodes, so there would be little complexity for the UE to add WLAN support for radio link measurements.

Proposal 3: Discuss whether operator WLAN radio link information should be obtained from the UE.

2.4. Offloading Indication

Assuming Proposal 3 is agreeable, the UE could readily obtain the radio link parameters whenever the UE is within coverage of the WLAN node. This information may be reported to the 3GPP node and the 3GPP node could consider whether offloading is needed. However, this assumes the UE's WLAN radio is always on which is not always true. The user or the UE may have turned off the WLAN radio to conserve power. If the UE doesn't know the 3GPP node's intention for offloading, there may be little reason for the UE to turn on its WLAN radio. Therefore, it would be beneficial for the 3GPP node to indicate its intention for offloading to the UE so that the UE may turn on its WLAN radio and measure the radio link parameters in a timely manner. Although this issue is closely tied to the subject of WLAN discovery/scanning optimization, such an indication will be beneficial regardless of which solution is ultimately adopted for WLAN discovery/scanning.

Proposal 4: 3GPP network should have a mechanism to inform the UE that WLAN offloading is needed.

3. Conclusion

This additional statement 1 describes some of the essential elements needed for network selection.

[Additional Statement 2]

1. Introduction

As a result of the discussion about how solutions (Solution 1, 2 and 3) can fulfill the requirements, Solution 2 seems to fulfill all requirements; although there remain a few unclear points, especially as they relate to ANDSF and RAN rules. This contribution provides further explanation on the differences and how they may be used to meet the traffic steering requirements. Further details on the fulfillment of requirements for Solution 2 are described in the Annex.

2. Discussion 2.1. ANDSF Vs RAN Rules

A few unclear points were described under Solution 2 for fulfillment of all requirements. Majority of the concerns come from the relationship between ANDSF policy and RAN rules. For example, some concerns come from the unpredictability of UE behavior or potential ping-ponging caused by unclear relationship between ANDSF policy and RAN rule. The answers to the issues below should help to clarify the relationships between ANDSF and RAN rules.

1) If ANDSF is not available, should RAN rules be used?

If ANDSF is not available, RAN should provide rules to ensure consistent behavior among UEs. Pre-provisioning of UEs with static rules may lead to unpredictable behavior since this is basically up to UE implementation. This flexibility is one of main advantages with Solution 2.

2) If ANDSF is available to the UE, which rule should the UE follow, ANDSF policy, RAN rules or both?

It is currently stated that, "Even if the ANDSF policy is provided to the UE, RAN has the option to indicate the preferred rule to be used by the UE". In principle, the UE should be allowed to use ANDSF if it is available to the UE and the UE supports ANDSF. However, to prevent any confusion, the decision of which rule to use is up to RAN to decide. If RAN knows that UE has ANDSF available, RAN should allow the UE to use ANDSF. If we allow the UE to use ANDSF when RAN has informed the UE that RAN rules should be used then the use of ANDSF would be left to UE implementation which would prevent uniform behavior among all UEs. Therefore, either the RAN rules or ANDSF policy would be used as decided by the RAN and not both.

3) If ANDSF is only available to some UEs but not all UEs (maybe some UEs are not ANDSF capable) could the RAN provide its rules only to those UEs without ANDSF?

It will be up to the RAN to decide whether to apply RAN rules or ANDSF policy. In our view, RAN rule should be provided to all UEs without distinction to avoid any confusion.

4) Do we apply the same rules for roaming UEs? Will the roaming UEs have the same ANDSF as the non-roaming UEs? Is it necessary for the roaming UEs to behave the same way as the non-roaming UEs?

Again, it will be up to the RAN to decide whether the UE uses RAN rule or ANDSF. Roaming UE's behavior can be predictable for operators if the UE performs traffic steering based on the rule provided by RAN. It is also good for load balancing.

5) Are there any cases where UE implementation is allowed when the UE is informed by the RAN to use RAN rules?

Following RAN rules does not imply the UE will automatically scan for WLAN and steer traffic to WLAN. RAN rules assume the UE may also account for its battery level status as part of WLAN scanning optimization. Details of WLAN scanning optimization is FFS. For traffic steering from RAN to WLAN, the UE selects traffic to be steered based on the specified DRB within RAN rules. For the selection of traffic to be steered from WLAN to RAN, the UE may use IFOM if available or UE implementation.

Table 1 summarizes the relationship between RAN rules and ANDSF.

TABLE 1

| RAN's Rule Preference | UE's action (if ANDSF is Available) | UE's action (if ANDSF is Unavailable) |
| --- | --- | --- |
| RAN Rules | RAN Rules | RAN Rules |
| ANDSF Policy | ANDSF Policy | UE uses legacy behavior |

Based on the above clarifications, we arrived at the following conclusions:

For Solution 2, RAN decides whether the UE uses RAN rules or ANDSF policy.

Proposal 1: If RAN decides that UE should use RAN rules, the UE will only use RAN rules even if ANDSF is available.

Proposal 2: If RAN decides that UE should use RAN rules, traffic steering from RAN to WLAN will be according to the traffic information which defines the data bearer selected for offloading.

Proposal 3: For traffic steering from WLAN to RAN, the UE may select traffic according to UE implementation or IFOM (if available).

2.2. Clarification on Load Information

In previous discussions, there were suggestions that RAN may indicate its load to the UE in order to trigger the traffic steering from RAN to WLAN. Such an indication has no benefit for operators. For load balancing, Solution 2 allows the RAN to adjust thresholds of 3GPP RAN RSRP, RSCP, WLAN BSS load and WLAN RSSI to vary the level of offloading desired. Additionally, accuracy of access network selection is also improved by using direct metrics rather than indirect metrics such as load information.

Figure 35:
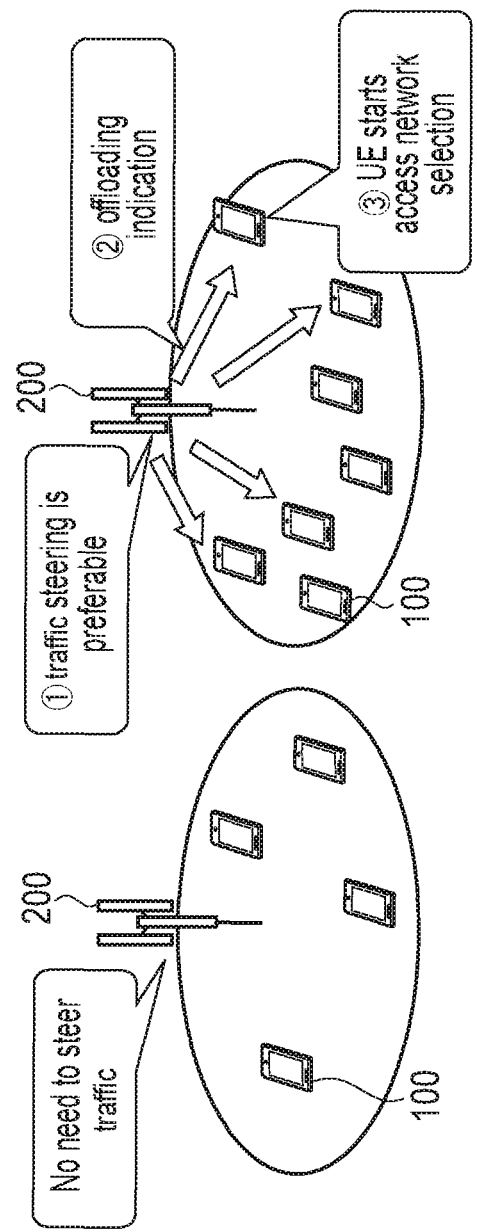
FIG. 35 is a diagram according to additional statements of embodiments.

Furthermore, Solution 2 can avoid inefficient scanning, traffic steering using offloading indication (refer to FIG. 35). If load level increases, RAN promotes network selection by sending an offload indication to the UE. UE initiates network selection using this indication as a trigger. The use of such an offload indicating will prevent any unnecessary scanning of WLAN esp. in the likely case when users turn off the UE's WLAN module to conserve power. The UE will only consider turning on the WLAN module if it receives the offload indication.

Proposal 4: For Solution 2, RAN may send an offload indication to inform the UEs of its intention for offloading from RAN to WLAN.

Proposal 5: Even if UE receive the offload indication from RAN, UE has the option to determine whether WLAN scanning is preferable based on UE implementation, e.g., battery level.

The left side of FIG. 35 indicates the case there is no need to perform traffic steering. The right side of FIG. 35 indicates UE initiates network selection using the offloading indication.

3. Conclusion

This additional statement 2 provides further explanation especially for the unclear points, describes refinement of Solution 2 and concludes the solution fulfils all the requirements.

4. Annex 4.1. Evaluation of Requirement Fulfillment

With the above clarifications of ANDSF and RAN rules, it would be of interest to reconsider whether Solution 2 satisfies the requirement fulfillments.

Requirement 1:

Solution 2 achieves the proper balance between RAN load and WLAN load APs by utilizing ANDSF or RAN rules. In particular, RAN rules will specify thresholds for 3GPP/WLAN signals and WLAN load to control traffic steering without explicitly providing RAN's load information. Even if ANDSF were available to the UE, RAN will decide whether ANDSF or RAN rules will be utilized to avoid any potential conflict between the two.

If ANDSF is unavailable to UEs, even with smart UE implementation, the policies used by the UEs may be different, so the outcome of the offloading may still be uncertain. With RAN rules, UE's behaviour is predictable which leads to predictable offloading control.

Unlike Solution 1, Solution 2 has the advantage that RAN can control the timing of applying the rules which should result in more accurate offloading control. For dynamic load control, RAN has the option to adjust thresholds as needed to enable timely access network selection.

Requirement 2:

User experience may be improved by specifying the rule that reflects RAN/WLAN signal qualities and WLAN load. The RAN specified thresholds and takes into account of existing 3GPP measurement reports, RAN state and the relative load generated by the UE so that both user experience and network performance may be improved.

Since Solution 2 is a UE-based access network selection solution, UE-specific needs such as steering IP flow rather than just DRB can be more easily fulfilled with less signaling.

Requirement 3:

For improving utilization of WLAN, improving user experience and reduction of battery consumption are needed. From this perspective, Solution 2 satisfies the requirement by allowing the UE to take into account of its battery level, proximity to WLAN and QoS needs to achieve the desired results.

Randomization may be applied to prevent excessive number of UEs from connecting to WLAN simultaneously.

Furthermore, offloading indication from RAN may be used to prevent unnecessary WLAN scanning UE initiates this procedure only if the indication is activated.

Requirement 4:

By specifying rules that allows the UE perform WLAN scanning only when certain RAN conditions are satisfied, battery consumption may be reduced. For instance, by allowing the UE to scan WLAN channel only when RSRP is less than a certain threshold, UE's power consumption may be reduced.

Requirement 5:

If RAN decides that the UE should use ANDSF, then the traffic steering may be based on ANDSF. If ANDSF is unavailable and the RAN decides that the UE should use RAN rules, the RAN may decide which traffic would be optimal for offloading to WLAN.

Requirement 6:

Solution 2 does not affect existing 3GPP and WLAN functionalities, so there is no impact to legacy systems.

Requirement 7:

Solution 2 follows existing WLAN scanning/connection mechanisms, so there is no impact to IEEE or WFA.

Requirement 8:

RAN may provide to the UE a white list (or black list) consisting of WLAN service set identifiers so that WLAN system distinction is possible. It is also possible to provision per SSID-thresholds.

In addition, Solution 2 may also rely on ANDSF to define WLAN specific system for offloading. RAN policy may also make use of existing ANDSF policy.

Requirement 9:

The fulfillment of this requirement is accomplished through the use of dedicated signaling for specific UEs.

Requirement 10:

By utilizing randomization (e.g. UE performs random backoff before testing whether the target cell is accessible or not) and providing a dedicated assistant information (e.g. threshold) for each UE, ping-ponging may be prevented. It is FFS whether additional mechanisms are needed.

[Additional Statement 3]

Rule Example:

if ANDSF is not available (or not preferred by RAN)
    if RAN RSRP<x or offloading indicator=yes
        if WLAN RSSI>y and WLAN BSS load<z
            offload from RAN to WLAN else if RAN RSRP>x'
        if WLAN RSSI<y' or WLAN BSS load>z'
            offload from WLAN to RAN
        else forwards the received assistance information to the interworking upper layer of the UE
    Note: Parameters x, x', y, y', z, z' are provided by Network
    Splitting between "If RAN RSRP<x or offloading indicator==yes" and "if WLAN RSSI>y and WLAN BSS load<z"

The motivation is UE can allow to be scanning optimization (including WLAN client off) if RAN RSRP>x and offloading indicator==no or not signaled. And UE do RAN RSRP measurement regardless scanning optimization is applied or not.

The reason two thresholds "If RAN RSRP<x" and "offloading indicator==yes" having Even if RAN does not indicate offloading desired, the UE may still want to scan for WLAN. It's just a way for the RAN to determine how many potential UEs may not be offloaded (i.e., those UEs with RSRP>x). That way the UE may still report WLAN measurements to the eNB, but that they wouldn't be targeted for offloading to WLAN. Sort of like MDT. So that RAN can refine the adjustment of "x" in the future. This would only be applicable for dedicated signaling.

The reason "if WLAN RSSI<y' or WLAN BSS load>z'" then UE should offload from WLAN to RAN It's dangerous the decision offload from WLAN to RAN is up to UE implementation or ANDSF. The important thing here is that the RAN rules can still be applied to determine if the UE should steer traffic from WLAN to RAN; however, the selection of traffic to be steered from WLAN to RAN will be based on UE implementation. (I.e., If UE applying RAN rules move to WLAN, RAN rules should also be used during UE. So UE applying RAN rules should keep its RAN rules until UE receive updated parameters (after move back to RAN) to prevent unnecessary ping-pong NW selection. Note Rule preference indicator is included in above "updated parameters".

The Necessity of Offload Preference Indicator

Listed parameters are provided by dedicated signaling or broadcast signaling (More specific, whether all listed parameters are provided by dedicated signaling or there is a possibility that some parameters can be provided by broadcast signaling.) If there is a situation that RSRP threshold and WLAN related threshold are provided by broadcast signal whereas remaining parameters are provided by dedicated signaling, RAN should not change RSRP threshold drastically. Then the Offload preference indicator is useful for NW making only UEs located in close to the WLAN move to WLAN, (if NW knows WLAN and UE's location.)

Of course, there is another possibility that NW send the updated parameters x, y, z by dedicated signaling instead of Offload preference indicator.

To summarize above procedure, UE may obey the rules described in below table 2.

TABLE 2

| | | If UE connect to WLAN | If UE connect to RAN |
|---|---|---|---|
| Assuming RAN load level isn't acceptable | RSRP < x Offload preference indicator == yes | N/A | if (WLAN RSSI > y and WLAN BSS load < z ) => Traffic steering based on RAN rule else => RAN |
| | RSRP > x Offload preference indicator == yes | N/A | if (WLAN RSSI > y and WLAN BSS load < z) => Traffic steering based on RAN rule else => RAN |
| Assuming RAN load level is acceptable | RSRP < x Offload preference indicator == no | N/A | if (WLAN RSSI > y and WLAN BSS load < z) => Traffic steering based on RAN rule else => RAN |
| | RSRP > x Offload preference indicator == no | N/A | RAN |
| | RAN RSRP > x' | if (WLAN RSSI < y' or WLAN BSS load > z') => Traffic steering based on UE implementation else => WLAN | N/A |
| | RAN RSRP < x' | WLAN | N/A |

[Additional Statement 4]
1. Introduction

One of the primary objectives of this study item is to determine how access network selection is handled and how traffic is selected for steering. With regards to access networks selection, 3 candidate solutions are currently included in TR37.834. However, it is unclear how the access networks selection procedure is initiated. It is an issue especially for UE-based access network selection such as Solution 1 and Solution 2 since the UE behaviour needs to be well defined. For network-based solution (i.e., Solution 3), access network selection for IDLE UEs may use similar techniques as UE-based solutions; therefore, this is a common issue for all access network selection solutions. This contribution clarifies the issues related access network selection and provides some recommendations.

2. Discussion

To achieve bi-directional load balancing, access network selection must be properly controlled. The procedure for triggering network selection should be based at least on the RAN's load condition. And the RAN should be able to provide the most up-to-date load information to the UE.

Figure 36:
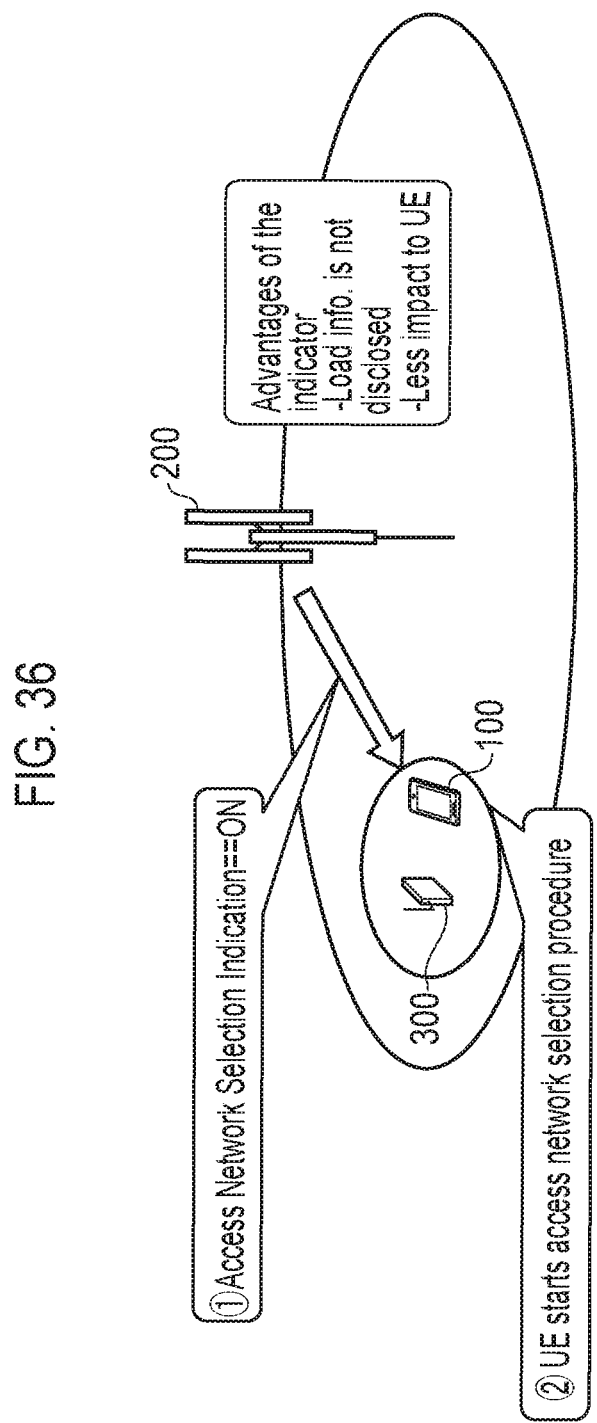
FIG. 36 is a diagram according to additional statements of embodiments.

However, many operators prefer not to provide direct load information to the UE (i.e., either as a percentage of load or as high/middle/low indication). Therefore, it may be preferable for the RAN to provide access network selection initiation trigger to the UE instead of providing direct load information, as illustrated in FIG. 36.

Proposal 1: Access Networks Selection Indicator should be used as a trigger for network selection.

It is FFS whether the indicator is an explicit indicator (e.g., a 1-bit indicator) or an implicit indicator implicitly included as part of the RAN provided parameters (e.g., by adjusting thresholds). Either of the two methods should be able achieve the same result. The implicit indicator may be a conditional expression for prompting an offload or an onload. For example, the indicator may be used for adjusting thresholds so as to prompt an offload or an onload. The indicator may be used for configuring offset values so as to prompt an offload or an onload.

2.1. Access Network Selection Indicator

Hereinafter, the discussions are mainly focused on Solution 2. It is assumed that RAN can switch value of the indicator depending on its load condition.

For access network selection, RAN should have the flexibility to satisfy the following network selection conditions.

Condition 1: RAN should be able to indicate to all UEs (both IDLE and CONN) to trigger network selection.

Condition 2: RAN may select specific UEs to trigger network selection.

Condition 3: It is not expected that RAN would only select IDLE UEs for network selection.

Both broadcast and dedicated signaling may be used for triggering network selection. This means RAN may provide both broadcast indicator and dedicated indicator to the same UE. In general, broadcast indicator is useful since the coverage size of WLAN is smaller than the macro cell, since it is difficult for the RAN to know which UE is within proximity of WLAN coverage. Dedicated indicator has the advantage that the RAN can configure a specific UE for access network selection (e.g., based on the UE's resource usage in the RAN). Therefore, the two indicators do not serve the same purpose and may even be set differently.

Therefore, RAN2 should consider whether broadcast indicator and dedicated indicator should be applicable to both IDLE UEs and CONN UEs so that UE's behaviour can be better understood. It should be already clear that dedicated signaling is applicable for specific UEs so the main question is whether the broadcast indicator should be applicable to all UEs or just the IDLE UEs. There are 2 candidate options.

1) Broadcast network access indication is only applicable to IDLE UEs.

With this option, it would be clear which signaling mechanism is applicable to which type of UEs. This option would prevent any need to resolve any conflict for UEs receiving both types of indicators. Although this option can satisfy the 3 conditions stated above, it may result in excessive signaling. For example, if the RAN wants all UEs to try and select WLAN, RAN will need to broadcast the network selection indicator and also send dedicated indicators to all CONN UEs.

2) Broadcast network access indication is applicable to all UEs.

With this option, the UE behaviour needs to be well defined since the CONN UEs may receive RAN indicators from either the broadcast signaling or dedicated signaling or both. However, this option does have the benefit that a single broadcast indicator can satisfy condition 1 above. For condition 2, the RAN may decide not to send broadcast indicator. Instead, RAN may send dedicated signaling to selective UEs (e.g., based on resource usage) for offloading. This option is useful when the RAN's load is moderate (e.g., middle) or when RAN's load is increasing gradually. Furthermore, providing the indicator to specific UEs may help to avoid mass toggling.

Since option ii) may result in the condition that the UE received indicators from both broadcast signaling and dedicated signaling, it is necessary to consider the interaction between the two indicators as summarized in Table 1. With option ii) the UE behaviours may be categorized in 3 patterns, UE Behaviour Type 1, 2, and 3 as depicted in Table 3. Table 3 basically suggests that offload indicator via dedicated signaling should override offload indicator via broadcasted signaling, since RAN may have specific reason(s) for configuring network selection for a specific UE.

TABLE 3

Example of UE Behaviour in connected mode

| Dedicated signalling | Broadcasted | | |
|---|---|---|---|
| | Access network selection indicator provided via broadcast signalling is not supported | Broadcasted access network selection indicator == ON | Broadcasted access network selection indicator == OFF* |
| Access network selection indicator is not provided via dedicated signalling | UE Behaviour Type 1 UE initiate selection procedure without indicator using. It is up to UE implementation when UE should initiate selection procedure. | UE Behaviour Type 2 Conn. UE initiates selection procedure | UE Behaviour Type 3 Conn. UE does not initiate selection procedure |

TABLE 3-continued

Example of UE Behaviour in connected mode

| | Broadcasted | | |
|---|---|---|---|
| Dedicated signalling | Access network selection indicator provided via broadcast signalling is not supported | Broadcasted access network selection indicator == ON | Broadcasted access network selection indicator == OFF* |
| Dedicated access network selection indicator == ON | UE Behaviour Type 2 Conn. UE initiates selection procedure | UE Behaviour Type 2 Conn. UE initiates selection procedure | UE Behaviour Type 2 Conn. UE initiates selection procedure |
| Dedicated access network selection indicator == OFF | UE Behaviour Type 3 Conn. UE does not initiate selection procedure | UE Behaviour Type 3 Conn. UE does not initiate selection procedure | UE Behaviour Type 3 Conn. UE does not initiate selection procedure |

It is FFS whether the RAN will always need to provide a broadcast indicator set to "OFF" or simply not sent any broadcast indicator when it has no desire to offload any UE to WLAN.

Proposal 2: Broadcast network access indicator should be applicable to both IDLE UEs and CONN UEs.

2.2. Scenarios for Access Network Selection 2.2.1. UE is Connected to RAN

If Proposal 2 is agreed, UE will initiate access network selection according to Table 1.

2.2.2. UE is Connected to WLAN (Attached to RAN)

Since the UE cannot receive dedicated indicator, the UE will initiate access network selection according to broadcasted indicator only. It is FFS if the UE can still continue the use the dedicated indicator after it transitions to IDLE and connected to WLAN. Additionally this UE can also determine whether to reselect back to 3GPP RAN if (measured_metricA>threshold3)|| (measured_metricB<threshold4).

3. Conclusion

This additional statement 4 proposes the benefits of using an access network selection indicator and describes UE's behaviours when such indicator is received at the UE. In conclusion, it is beneficial to provide such indicator from 3GPP RAN to UEs. If broadcast network selection indicator is applicable to both IDLE UEs and CONN UEs, the UE behaviour as shown in Table 3 should be clarified.

CROSS REFERENCE

The entire contents of U.S. Provisional Application No. 61/808,777 (filed on Apr. 5, 2013), U.S. Provisional Application No. 61/864,219 (filed on Aug. 9, 2013), U.S. Provisional Application No. 61/898,791 (filed on Nov. 1, 2013), and U.S. Provisional Application No. 61/934,364 (filed on Jan. 31, 2014) are incorporated herein by reference.

INDUSTRIAL APPLICABILITY

The present disclosure is useful for radio communication fields.

The invention claimed is:

1. A user terminal, comprising:
a controller containing at least one processor and at least one memory, and configured to communicate data using a wireless local area network (WLAN) while the user terminal has a radio resource control (RRC) connection with a cellular base station, wherein
the controller is further configured to execute processes of:
receiving a WLAN measurement configuration from the cellular base station, the WLAN measurement configuration including first WLAN identifiers;
receiving a beacon signal from at least one WLAN;
acquiring WLAN load information included in the beacon signal, the WLAN load information indicating degree of congestion of the at least one WLAN;
measuring WLAN received signal strengths for WLANs based on the WLAN measurement configuration;
prioritizing second WLAN identifiers corresponding to the WLANs based on the WLAN received signal strengths;
generating a list including the second WLAN identifiers in order of priority; and
transmitting a report including the list to the cellular base station, the report further including the WLAN load information.

2. The user terminal according to claim 1, wherein
in the process of measuring, the controller measures the WLAN received signal strengths based on the first WLAN identifiers included in the WLAN measurement configuration, and
the second WLAN identifiers includes at least one of the first WLAN identifiers.

3. The user terminal according to claim 1, wherein the controller is further configured to execute processes of:
after transmitting the report, receiving a bearer information indicating a bearer from the cellular base station; and
communicating data of the indicated bearer using the WLAN.

4. The user terminal according to claim 3, wherein the controller is further configured to execute a process of:
after receiving the bearer information, communicating the data using the WLAN while maintaining the RRC connection.

5. The user terminal according to claim 1, wherein the controller is further configured to execute processes of:
   after transmitting the report, receiving a WLAN identifier indicating a WLAN selected by the cellular base station, from the cellular base station; and
   communicating data using the WLAN selected by the cellular base station.

6. The user terminal according to claim 5, wherein the controller is further configured to execute a process of:
   after receiving the WLAN identifier indicating the WLAN selected by the cellular base station, communicating the data using the WLAN selected by the cellular base station while maintaining the RRC connection.

7. An apparatus for a user terminal, comprising:
   at least one processor and at least one memory, the at least one processor configured to communicate data using a wireless local area network (WLAN) while the user terminal has a radio resource control (RRC) connection with a cellular base station, wherein
   the at least one processor is further configured to execute processes of:
   receiving a WLAN measurement configuration from the cellular base station, the WLAN measurement configuration including first WLAN identifiers;
   receiving a beacon signal from at least one WLAN;
   acquiring WLAN load information included in the beacon signal, the WLAN load information indicating degree of congestion of the at least one WLAN;
   measuring WLAN received signal strengths for WLANs based on the WLAN measurement configuration;
   prioritizing second WLAN identifiers corresponding to the WLANs based on the WLAN received signal strengths;
   generating a list including the second WLAN identifiers in order of priority; and
   transmitting a report including the list to the cellular base station, the report further including the WLAN load information.

8. A method for a user terminal configured to communicate data using a wireless local area network (WLAN) while the user terminal has a radio resource control (RRC) connection with a cellular base station, comprising:
   receiving a WLAN measurement configuration from the cellular base station, the WLAN measurement configuration including first WLAN identifiers;
   receiving a beacon signal from at least one WLAN;
   acquiring WLAN load information included in the beacon signal, the WLAN load information indicating degree of congestion of the at least one WLAN;
   measuring WLAN received signal strengths for WLANs based on the WLAN measurement configuration;
   prioritizing second WLAN identifiers corresponding to the WLANs based on the WLAN received signal strengths;
   generating a list including the second WLAN identifiers in order of priority; and
   transmitting a report including the list to the cellular base station, the report further including the WLAN load information.

\* \* \* \* \*